United States Patent
Jelbert et al.

(10) Patent No.: US 10,023,200 B2
(45) Date of Patent: *Jul. 17, 2018

(54) DRIVER PROFILING SYSTEM AND METHOD

(71) Applicant: MYDRIVE SOLUTIONS LIMITED, Guildford Surrey (GB)

(72) Inventors: Richard Jelbert, Midhurst (GB); Gavin Heavyside, Maidenhead (GB)

(73) Assignee: MYDRIVE SOLUTIONS LIMITED, Guildford Surrey (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/582,391

(22) Filed: Apr. 28, 2017

(65) Prior Publication Data

US 2017/0369070 A1    Dec. 28, 2017

Related U.S. Application Data

(63) Continuation of application No. 13/825,106, filed as application No. PCT/GB2011/051767 on Sep. 20, 2011, now Pat. No. 9,701,316.

(30) Foreign Application Priority Data

Sep. 20, 2010 (EP) .................................... 10177555

(51) Int. Cl.
*B60W 40/09* (2012.01)
*G07C 5/08* (2006.01)

(52) U.S. Cl.
CPC ............. *B60W 40/09* (2013.01); *G07C 5/085* (2013.01); *G07C 5/0808* (2013.01);
(Continued)

(58) Field of Classification Search
CPC .......... B60W 40/09; B60W 2550/402; B60W 2550/141; B60W 2540/30; G07C 5/085; G07C 5/0808
See application file for complete search history.

(56) References Cited

U.S. PATENT DOCUMENTS

2003/0093209 A1*  5/2003  Andersson ......... B60K 31/0058
                                                   701/93
2005/0131597 A1*  6/2005  Raz ....................... G09B 19/167
                                                   701/29.1
(Continued)

FOREIGN PATENT DOCUMENTS

| EP | 1302356 A1 | 4/2003 |
| EP | 1811481 A1 | 7/2007 |
| EP | 2174838 A1 | 4/2010 |

OTHER PUBLICATIONS

"U.S. Appl. No. 13/825,106, Amendment and Response to Non-Final Office Action filed Dec. 22, 2016", 22 pgs.
(Continued)

*Primary Examiner* — Yuen H Wong
(74) *Attorney, Agent, or Firm* — Schwegman Lundberg & Woessner, P.A.

(57) ABSTRACT

A computer-implemented method of profiling a driver comprises: identifying events in data representing motion of a vehicle; for the events, associating an event with a profile index relating at least to a link on which the vehicle was travelling when the respective event occurred; sorting the events into groups, each group corresponding to a different profile index; determining a driver profile from the events; and characterizing the driving behavior of the driver on the basis of the driver profile.

19 Claims, 9 Drawing Sheets

(52) U.S. Cl.
CPC ... *B60W 2540/30* (2013.01); *B60W 2550/141* (2013.01); *B60W 2550/402* (2013.01)

(56) References Cited

U.S. PATENT DOCUMENTS

2007/0282638 A1    12/2007    Surovy
2014/0039749 A1    2/2014    Jelbert et al.

OTHER PUBLICATIONS

"U.S. Appl. No. 13/825,106, Examiner Interview Summary dated Dec. 5, 2016", 3 pgs.
"U.S. Appl. No. 13/825,106, Final Office Action dated Apr. 10, 2015", 18 pgs.
"U.S. Appl. No. 13/825,106, Non Final Office Action dated Jul. 22, 2016", 21 pgs.
"U.S. Appl. No. 13/825,106, Non Final Office Action dated Oct. 9, 2014", 18 pgs.
"U.S. Appl. No. 13/825,106, Non Final Office Action dated Nov. 4, 2015", 20 pgs.
"U.S. Appl. No. 13/825,106, Notice of Allowance dated Mar. 1, 2017", 17 pgs.
"U.S. Appl. No. 13/825,106, Preliminary Amendment filed Mar. 19, 2013", 5 pgs.
"U.S. Appl. No. 13/825,106, Response filed Mar. 9, 2015 to Non Final Office Action dated Oct. 9, 2014", 17 pgs.
"U.S. Appl. No. 13/825,106, Response filed May 4, 2016 to Non Final Office Action dated Nov. 4, 2015", 19 pgs.
"U.S. Appl. No. 13/825,106, Response filed Oct. 13, 2015 to Final Office Action dated Apr. 10, 2015", 17 pgs.
"European Application Serial No. 10177555.9, Extended European Search Report dated Feb. 22, 2011", 6 pgs.
"International Application Serial No. PCT/GB2011/051767, International Search Report dated Jun. 18, 2012", 3 pgs.
"International Application Serial No. PCT/GB2011/051767, Written Opinion dated Jun. 18, 2012", 5 pgs.

\* cited by examiner

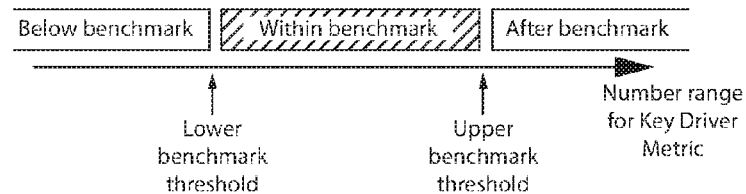
Fig. 10A
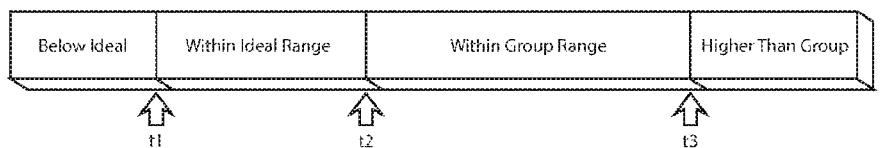
Fig. 10B
Fig. 11

DRIVER PROFILING SYSTEM AND METHOD

CROSS-REFERENCE TO RELATED APPLICATIONS

This application is a continuation of and claims the benefit of priority under 35 U.S.C. § 120 to U.S. patent application Ser. No. 13/825,106, filed on Mar. 19, 2013, which is a U.S. national stage application filed under 35 U.S.C. 371 from International Application No. PCT/GB2011/051767, which was filed Sep. 20, 2011, and published as WO 2012/038738 on Mar. 29, 2012, and which claims the benefit of priority of European Patent Office Application No. 10177555.9, filed Sep. 20, 2010, which applications and publication are incorporated by reference as if reproduced herein and made a part hereof in their entirety, and the benefit of priority of each of which is claimed herein.

The present invention relates to a method and system for profiling the performance of a driver of a vehicle, for example a motor car or lorry.

There is currently much interest in the area of driving style analysis. For one reason, the increased use of position sensors such as GPS sensors that are fitted as standard in many mobile devices, portable navigation devices and in motor vehicles mean that the raw data needed to obtain information about the motion of a vehicle and hence about the performance of the driver of that vehicle is available at low cost. At the same time, the increases in the price of fuel, and the general heightening of awareness of the environmental impact of motor transport, have also made fleet managers and individual drivers more conscious of the efficiency of, and the desire to improve efficiency, of their fleet and drivers. There is also increased awareness of safety aspects of driving, as current legislation means that companies have an increasing duty of care for their staff when driving on company business—and enabling a company to understand the driving style of their drivers allows them to provide improved training that is directed to specific aspects of a particular driver's driving style that may need improvement.

Prior art systems for monitoring performance of a driver are known. Typically, these work by sending an alert if they detect an "exceedance" in the driver's behaviour, such as exceeding a pre-set maximum speed, or braking or accelerating at more than a predetermined rate. For example, EP1481344 discloses a system in which the determined location and speed of a vehicle can be compared to an electronic map to determine whether the vehicle is exceeding the speed limit at a particular location.

These prior art systems suffer from disadvantage that they can provide only a relatively crude measure of a driver's performance. For example, a stretch of road will typically have sections where the best driving speed is below the legal speed limit for the road (for example such as a sharp bend or an approach to a junction), and that negotiating such sections at the legal speed limit was less than optimum behaviour. Prior art systems would not, however, generate an alert if the driver negotiated such sections at the legal speed limit for that stretch of road.

A further disadvantage of these prior systems is that they can indicate only where and when an exceedance occurred, but they cannot give any information as to why, or under what typical conditions a particular driver is likely to commit an exceedance.

A first aspect of the present invention provides a method of profiling a driver comprising: identifying events in data representing motion of a vehicle, the events including acceleration events and/or braking events; selecting one or more of the events based on a profile index associated with a respective event, the profile index relating at least to a link on which the vehicle was travelling at a point during the respective event; determining a driver profile from the selected events and characterising the driving behaviour of the driver on the basis of the driver profile.

It should be noted that, since an event has a finite duration, an event may span two or more links—that is, the event may start when the vehicle is on one link and finish when the vehicle is on another link—and the vehicle may possibly also have traversed one or more intermediate links in the duration of the event. A profile index assigned to an event may therefore correspond to the link on which the vehicle was travelling at a certain point of the event, such as the start of the event or the end of the event. If desired, an event may be associated with two or more profile indexes relating to links on which the vehicle was travelling at two or more points in the duration of the event.

Driver profiling techniques have conventionally been based on recorded speed. Making use of braking and/or acceleration events allows more information about the driver behaviour to be obtained. Furthermore, by use of event attributes the invention makes it possible to gain more information about driver behaviour than by simply noting that an event has occurred, and in preferred embodiments it is possible to use information relating to the entirety of an event (such as start location and end location) that makes it possible to obtain information about when the driver made a decision. In contrast, in a conventional method that measures driver behaviour by looking for an exceedance, noting that an exceedance has occurred provides no information about the circumstances leading the driver to commit that exceedance. For example, simply detecting that braking above a certain rate has occurred does not provide any information as to whether the driver is reacting to external factors such as bad behaviour by other road users, or whether the driver was late in making a decision such as, for example, to slow down on the approach to a corner.

In one embodiment, one or more events may first be selected for use in analysis on the basis of one or more attributes. (For example, it may be desired to consider braking events that result in a low speed, so braking events have a value of their "final speed" attribute below a certain value may be selected.) A profile index is then generated for each of the selected events, and the events may then be sorted into groups based on the profile index, and possibly based on one or more other attributes. One or more of the groups of events are then selected for use in building up the driver profile. This embodiment is computationally efficient, since a profile index is not generated for an event that is not selected in the initial selection stage. The invention is however not limited to this, and may be carried out in other ways. For example events may be sorted into groups based on a profile index associated with a respective event and on at least one attribute derived from the respective event, and one or more groups may then be selected. This allows better analysis of the driver behaviour, as it enables less relevant events to be excluded from use in determining the driver profile.

The attribute associated with an acceleration or braking event (or indeed with other types of events) may for example be the speed at which the vehicle was travelling when the respective event occurred, or may be the speed at a certain point in the duration of the event, such as the speed at one or more of the start of the event, the end of the event, and the speed at an intermediate time in the duration of the event. Characterising an acceleration event or a braking event by its speed may for example comprises denoting an event as a "high speed" or "low speed" event depending on whether a vehicle speed associated with the event, for example the vehicle speed at the end of the braking, is greater or less than a threshold. Moreover, embodiments of the invention may also make use of "braking while cornering" events, which provide information about how well a driver plans ahead. Additionally or alternatively, attributes of an event may include one or more locations associated with an event, such as one or more of the start location (ie, the location at which the event started), the finish location (ie, the location at which the event finished), and an intermediate location associated with the event, and/or may include one or more times associated with an event, such as one or more of the start time (ie, the time at which the event started), the finish time (ie, the time at which the event finished). In the case of a braking event or an acceleration event, for example, the location at which peak braking, or peak acceleration, occurs may be an attribute of the event.

An advantage of capturing attributes of an event is that events can be grouped by one or more attributes, for example by the magnitude or range of an attribute, and not just by event type. For example acceleration and braking events may be grouped according to whether the start or end speeds are above or below a threshold, and cornering events may be grouped by the speed at which the events occurred. Grouping events by one or more attributes allows events to be classified according to whether they are 'of interest' or not, for example by comparing an attribute of the events against a threshold. Events that are classified as not of interest may be excluded from further analysis. Grouping events by aspects of their attributes enables more granular analysis and better understanding of the nature of events in the context of the road network.

A specific example of the utility of this approach would be analysing the behaviour of drivers around junctions. To characterise the behaviour of the driver on slowing down or stopping at give-way junctions, only braking events that result in the vehicle being at low speed are of interest. A high speed braking event (that is an event where speed is still high after the braking event) could suggest that the driver was for example adjusting their speed to maintain distance behind another vehicle, so the braking event is not related to their behaviour at a junction. The geometry of the data points used to identify the event are also used to inform the profile index selection; when identifying the event as representing braking to a junction the link at the end of the manoeuvre is the pertinent one even though the event as a whole might span several links.

A further example is that, when considering cornering events, it may be desirable to consider only cornering events having an associated speed that is above a threshold. A cornering event at low speed represents little risk of the vehicle skidding, and so less information about the driver behaviour can be obtained from such events. In contrast cornering events that occur at high speeds can suggest that the driver is not reacting sufficiently to bends in the road (particularly if a braking event is also detected).

Thus, grouping events by aspects of their attributes, as well as grouping by profile index, enables analysis of specific aspects of behaviour which would not be possible if events on one type (eg braking events) were grouped as a whole.

Characterising the driving behaviour of the driver may comprise determining one or more numeric scores, each score providing a measure of a respective personality trait that affects driving behaviour or other conclusion generated by the invention. For example a numeric score may be determined for one or more of "aggression", "anticipation", "pace" and "smoothness", and/or a numeric score may be determined that provides an overall measure of the driver's driving behaviour.

The attribute of a respective event may include at least one of: a start time of the event; a finish time of the event; a duration of the event; a start speed (that is, the speed of the vehicle at the start of the event); a finish speed (that is, the speed of the vehicle at the finish of the event); a start location; a finish location; an intermediate or a maximum rate of acceleration or braking during the event. In the case of a braking event or an acceleration event, for example, the location at which peak braking, or peak acceleration, occurs may be an attribute of the event.

The method may comprise performing one or more analysis steps on the analysis profile. For example, the analysis profile may be compared to a reference profile, although the invention is not limited to this particular analysis step.

The profile index may be derived from one or more link indexes relating to feature(s) of the link that influence the behaviour of a driver of a vehicle travelling along that link.

The profile index may further be derived from one or more indexes that are time-dependent and/or driver-dependent.

The events may further include one or more events selected from the group consisting of: speed events, cornering events, familiarity events and distance events.

The one or more link indexes include at least one index specifying a road classification of the link on which the event occurred.

The road classification may include at least one of road type and road setting.

Determining the driver profile may comprise grouping events by both event type and profile index.

The method may further comprise deriving an analysis profile from the driver profile, the analysis profile having a lower granularity than the driver profile.

Data points in the driver profile may, for at least one profile index, be classified against a plurality of possible values for the profile index, and wherein deriving the analysis profile comprises selecting data points corresponding to a subset of possible values of the profile index.

Data points in the driver profile may, for at least one profile index, be classified against a plurality of possible values for the profile index, and wherein deriving the analysis profile comprises merging two or more possible values of the profile index.

The method may further comprise comparing the analysis profile to a reference profile.

The reference profile may be a profile for one or more advanced drivers. Alternatively, the reference profile may be a profile for one or more drivers of approximately the same age and/or driving experience as the driver.

As a further alternative, the reference profile may be a profile obtained by combining at least a first profile for a first group of drivers and a second profile for a second group of drivers.

The invention also provides a device for profiling a driver comprising: means for identifying events in data representing motion of a vehicle, the events including acceleration events and/or braking events characterised by the speed at which the vehicle was travelling when the respective event occurred; for the events; means for selecting one or more of the events based on a profile index associated with a respective event and on at least one attribute derived from the respective event, the profile index relating at least to a link on which the vehicle was travelling at a point in the respective event; means for determining a driver profile from the selected events; and means for characterising the driving behaviour of the driver on the basis of the driver profile.

The invention also provides a computer-readable medium containing instructions that, when executed by a processor, cause the processor to perform a method of the first aspect.

The invention further provides a device for profiling a driver comprising: means for generating a network of links from a road map; and means for generating, for a link, one or more link indexes, at least one link index being associated with an attribute that influences the behaviour of a driver traversing that link.

This embodiment generates, for a link, at least one link index that relates to attributes that influence the behaviour of a driver traversing a link, for example when the driver is transitioning onto (eg, joining) that link. For example attributes such as whether a driver may have to turn in order to join a link, or may merge into a traffic lane, are important when analysis driver behaviour. It is known for commercial road maps to include metadata designed to advise a driver of a forthcoming manoeuvre (for example to provide advance warning of a sharp corner), but this metadata is not used, and is not suitable for use, in analysis of driver behaviour. This aspect of the invention therefore customises metadata to allow post-hoc (subsequent) analysis of driver behaviour. However, these factors are not considered relevant for journey planning and so are not included in conventional digital road maps—but are important for driver behaviour. A link index generated according to this aspect of the invention thus allows improved analysis of driver behaviour.

It is possible to derive attribute(s) that influence the behaviour of a driver joining a link from the topology of a network.

The link indexes may include indexes associated with one or more of Road Category, Link Length, Lane Count, Road Density, Junction Category, Road Curvature, Start-or-End-Point-Only.

The link indexes may include road classification.

The invention also provides a method of profiling a driver comprising: generating a network of links from a road map; and for a link, generating one or more link indexes, each joining index being associated with an attribute that influences the behaviour of a driver traversing that link. The method may be a computer-implemented method. The invention also provides a computer-readable medium containing instructions that, when executed by a processor, cause the processor to perform such a method.

The present invention can generate a highly detailed profile of driver behaviour, under a wide variety of different circumstances and conditions, and for a wide variety of different circumstances and conditions. The present invention makes use of the context of events such as heavy braking or acceleration or speed etc, and can therefore provide a profile that contains more information about the behaviour of a particular driver. By providing more useful and detailed information, a fleet manager, for example, is able to identify drivers who are the most aggressive, inattentive or inefficient, and provide training to improve the standard of their driving. This ability to provide targeted training will lead to lower use of fuel, less environmental pollution, and greater safety.

Another feature of the invention provides a method of profiling a driver comprising: determining a driver profile from events in data representing motion of a vehicle being driven by the driver; comparing the driver profile with a benchmark driver profile; and determining a measure of performance of the driver based on the results of the comparison. The method may be a computer-implemented method. The invention also provides a computer-readable medium containing instructions that, when executed by a processor, cause the processor to perform such a method.

The invention also provides a device for profiling a driver comprising: means for determining a driver profile from events in data representing motion of a vehicle being driven by the driver; means for comparing the driver profile with a benchmark driver profile; and means for determining a measure of performance of the driver based on the results of the comparison.

A device of the invention may be embodied as a processor suitably programmed to implement each of the recited means.

Preferred embodiments of the present invention will now be described by way of example with reference to the accompanying drawings, in which.

Figure 12:
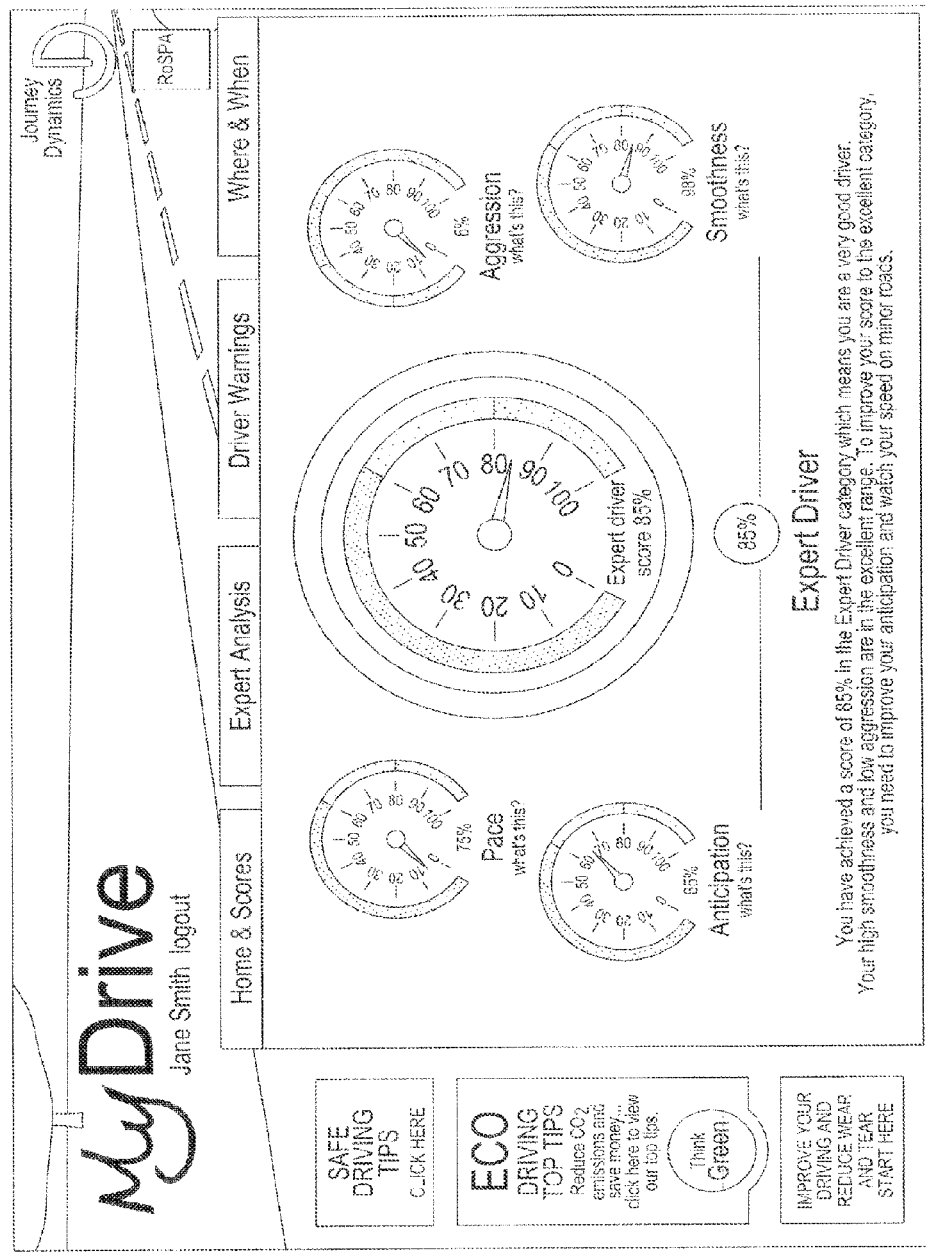
Figure 13:
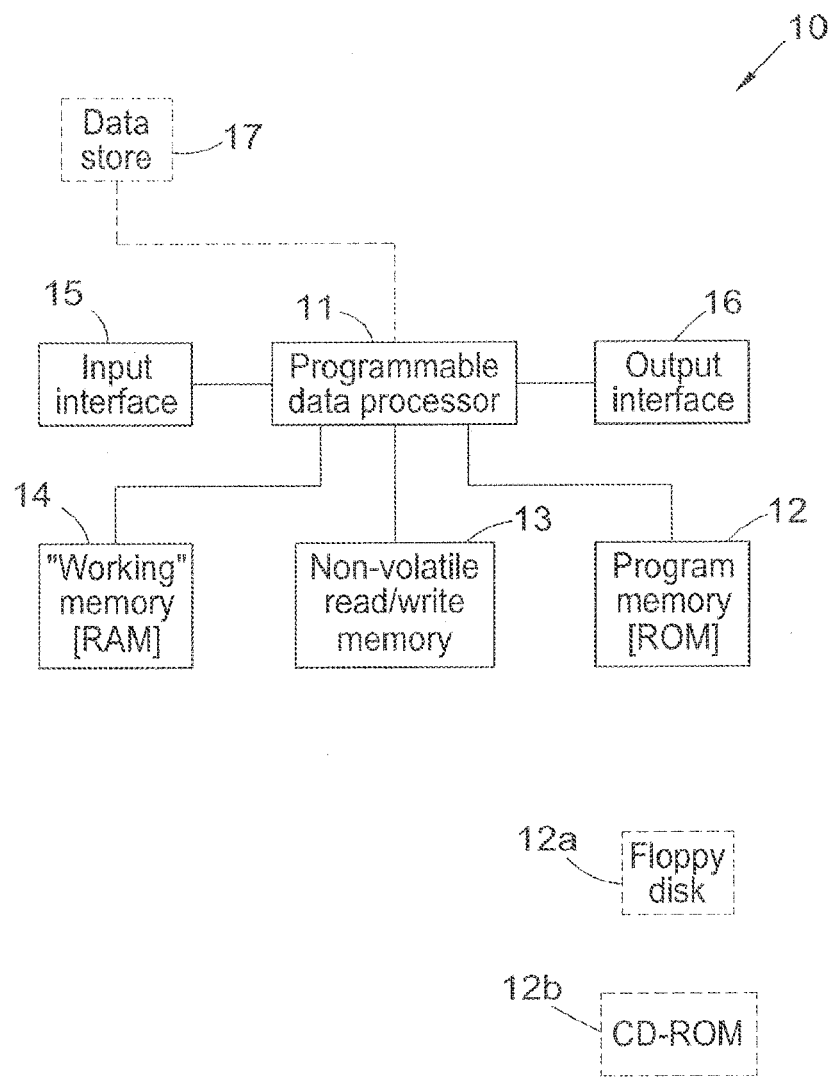
Figure 14:
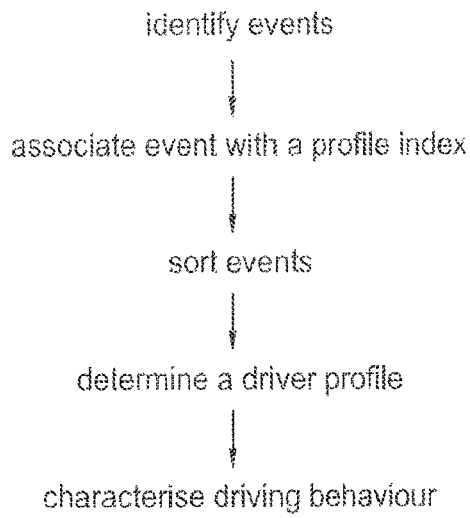
Figure 15:
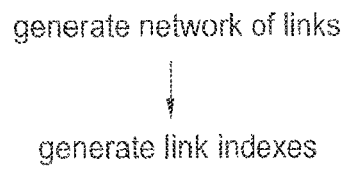
Figure 16:
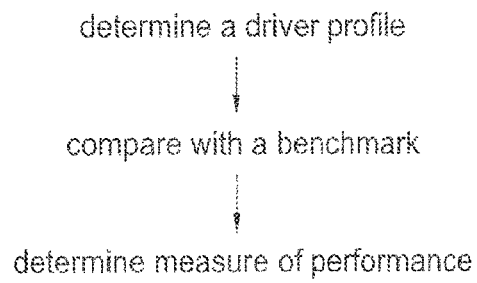

FIGS. 10(a) and 10(b) are schematic illustrations of benchmarking a driver;

FIG. 11 illustrates a typical driver profile generated by the present invention;

FIG. 12 illustrates a typical display of a driver score generated by the present invention;

FIG. 13 is a block schematic diagram of a system according to the present invention;

FIGS. 14, 15 and 16 are block flow diagrams illustrating principal steps of methods according to embodiments of the invention.

Figure 1:
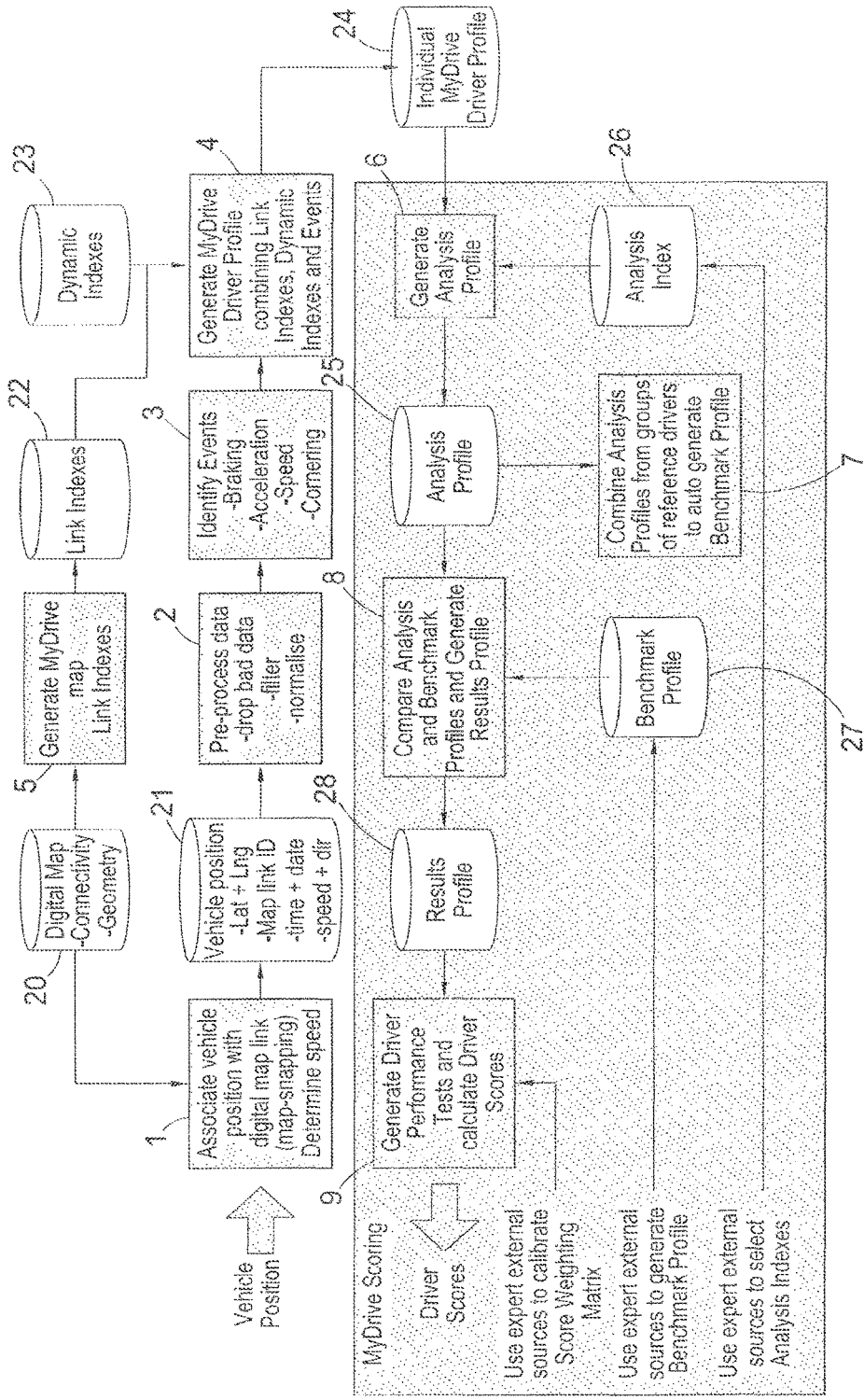
FIG. 1 is a block schematic diagram of a method of the present invention.

FIG. 1 is a block schematic diagram of a method according to one embodiment of the present invention. In the method of FIG. 1, data are initially generated on a motor vehicle (not shown). The data are preferably obtained by a free-standing position sensor mounted on the vehicle that is, a position sensor that is independent of the main vehicle bus. This allows any vehicle to be used in the invention by providing a suitable position sensor on the vehicle. A suitable sensor is a GPS sensor or other position-determining sensor that can record at least the position of the vehicle at successive sampling times. The output from the sensor is therefore a sequence of values of, at minimum, position and time data that includes the position of the vehicle (for example its latitude and longitude) and the relevant time and date at which the vehicle was at that position. The data may also include other information, such as the height above sea level of the vehicle, the speed and direction of travel of the vehicle.

If the invention is applied with a vehicle in which further data is available, for example a vehicle that has sensors connected to the main vehicle bus, this data may also be used in the invention. Examples of data that may be provided by sensors hard-wired into the vehicle bus include acceleration data from an accelerometer, the steering angle, and the position of the accelerator or brake pedal. However, the invention may be implemented even if this information is not available.

The data acquired from the position sensor on the vehicle, and optionally data acquired from any hard-wired sensor, may be transmitted to a processing location. The data may be transmitted in any suitable way. For example, the position data may be transmitted to the processing location in real time or in near real-time, for example by wireless transmissions. Alternatively, the position data may be stored in a buffer on the vehicle, with the data being sent periodically to the processing location. As a yet further alternative, the data may be stored in the vehicle, and may be down-loaded at the end of a journey, or at the end of day.

At stage 1 of FIG. 1, the sets of position and time data are associated with a link, of a behaviour-oriented map 20, on which the vehicle was travelling when the data were sampled. For example, this may conveniently be done by assigning, to a set of position and time data, a "link ID" that identifies the link on which the vehicle was travelling when the data were sampled. When positional data are received from a vehicle, each data point is examined to find the nearest link in the map 20, in a process sometimes referred to as "snapping" the data on the map. Generation of the behaviour-oriented map 20 is described with reference to stage 5 of FIG. 1.

The output 21 of stage 1 is therefore a sequence of values of, at minimum, position data, time data and link ID that denotes the position of the vehicle (for example its latitude and longitude), the relevant time and date at which the vehicle was at that position, and the identity of the link on which the vehicle was travelling. If other data are available, these may also be included.

It should be noted that stage 1 may be performed at the processing location or may be performed on the vehicle before data are transmitted to the processing location. For stage 1 to be performed on the vehicle would require that the processor on board the vehicle was aware of the geometry of the link IDs of the behaviour-oriented map 20 in order for them to be associated with the time and position data at stage 1.

It should also be noted that stage 1 may alternatively comprise associating the sets of position and time data with a road link on a conventional digital road map. In this case, a further step (not shown) is required to associate the road link with a link on the behaviour-oriented map 20.

When the data are processed, they initially undergo pre-processing (stage 2 in FIG. 1) to eliminate any obviously unreliable or corrupted data, and to filter the data. The data are then processed, at stage 3, to identify "events" in the driver's performance. Events may relate to one or more features of the driver's performance including, without limitation, one or more of: braking, acceleration, speed and cornering. If data from sensors hard-wired into the vehicle bus are available, other events may also be identified such as steering input. Stage 3 may also comprise identifying a "familiarity event", which records that the vehicle has driven on a specific road link on a given day, and/or determining a "distance event", which is a means of estimating total distance that a vehicle has covered.

According to the invention, the events identified at stage 3 are then correlated at stage 4 with data relating to the link on which a respective event occurred, to generate a driver profile 24. As explained below, a driver profile is the set of "Profile Data Points" generated from all events for a particular driver. A driver profile generated at stage 4 may be saved in a database for use when required. Generation of the data relating to the links is carried out at stage 5 of the method of FIG. 1.

The starting point for stage 5 is a digital road map of the relevant area. These digital maps are well-known, for example for vehicle navigation systems. However, they are directed to applications such as journey planning, and the data provided by a digital map is therefore organised around physical attributes that relate, for example, to the importance of a road for routing traffic. The attributes of known digital maps are not designed to, and are not suitable to, provide information about how the behaviour of a driver is influenced by a particular section of road. The present invention therefore generates, at stage 5, a new map that is directed to providing information about driver behaviour, and that is accordingly populated with attributes that are used to categorise driver behaviour. In brief, the invention defines map features called "links", and the map generated at stage 5 is a network of links. As described below, there need not be a one-to-one correlation between the links of the map generated at stage 5 and the road links of the digital map 20. Each link has a related set of attributes called "link indexes", shown generally as 22, each of which is an attribute that influences the behaviour of a driver. Attributes of a link that do not change, for example the number of lanes that a link has, or the width curvature of a link, may be considered as "static attributes".

Basic link attributes such as the number of lanes, width or speed limit can usually be derived from the digital road map, as these features are taken into account for journey planning/navigation which is the primary intended use of a digital road map. According to the present invention, further link attributes are derived to supplement these basis link attributes, and examples of derived link attributes include the following:

Road situation, eg curvature (road curvature is not considered relevant for journey planning, but is important for driver behaviour);

Road setting, eg how many other roads are in the vicinity for example a road setting may be classified as "urban" or "rural";

Toplogical/connectivity attributes—for example what must a driver do to join a link, such as turn, or merge into a traffic lane—again, these not considered relevant for journey planning, but is important for driver behaviour.

In addition, data relating to other features that may influence driver behaviour, such as congestion, may also be generated, and these are shown generally as "dynamic attributes" 23. For example, a certain link may have related data that identifies that this link is subject to traffic congestion at certain times and on certain days of the week. Thus, it is possible to define a congestion index, which can be considered as a "dynamic index" since its value is not fixed but varies with time of day. Any attribute that may vary over time and that influences driving behaviour may be used as a dynamic index, and another possible dynamic index is the weather (or, more generally, one or more attributes of the weather such as whether it is raining). Time itself may also be used as a dynamic attribute, since the time of day may affect a driver's behaviour. The familiarity of a driver with a particular link may also be regarded as dynamic attribute of the link.

The link indexes and the dynamic indexes are used in the determination of the Driver Profile at stage 4.

In general, stage 5 need be performed only once for any geographic area. Once the process has been carried out for a particular geographic area, the link indexes 22 (which are stored for future use) may be used to analyse the performance of any driver who drives a vehicle in that particular area. It will, however, be appreciated that the link indexes may need to be updated, for example as new roads are built, as traffic patterns change, etc—this may for example be done periodically, or when a new road is built.

At stage 6, an Analysis Profile 25 is generated from the driver profile for a particular driver. Since a driver Profile is generated from all events associated with a driver it will contain a large number of data points and can be considered as a high resolution profile. While the complete driver profile can in principle be used for comparison of a driver's performance with other drivers or the same driver at other times, the size of the profile means that manipulating the complete driver profile may be difficult. The invention therefore proposes use of the analysis profile for a driver, which is obtained by selecting parts of the driver profile that relate to certain events and/or by merging parts of driver profile that relate to different events. For example, certain parts of the driver profile may be selected for use in analysing or identifying certain driver behaviours. Thus, the analysis profile of a driver may be considered as a lower resolution, or lower granularity, version of the driver profile.

For example, the events in the driver profile may be arranged into groups, with one group for each road type. The events that occur on road links of a particular road type may then be examined separately from events occurring on links of other road types. Furthermore, road links may also be classified according to their setting, as well as to their road type. In the example shown in FIG. 11, road links are classified into four road types ("trunk", "major", "minor" and "local", and into three road settings ("urban, "suburban" and "rural", giving 12 possible combinations. The driver behaviour may be examined separately for each of these 12 combinations of road type and road setting.

An analysis index 26 is used to generate the analysis profile at stage 6. The analysis index determines which parts of the driver profile are selected, or are merged, for inclusion in the analysis profile. External sources may be used to generate the analysis index 26. An analysis index generated at step 6 may be saved in a database for use when required.

The result of stage 6 is an analysis profile of a driver that is in some sense "absolute", since it is derived from events identified solely in the behaviour of the vehicle driven by that particular driver. It may, however, be more useful to provide a "relative" profile, in which the behaviour of a particular driver is compared with one or more "benchmarks". The method therefore preferably comprises the further stage of comparing the analysis profile for a particular driver with one or more benchmark profiles, at stage 8. The invention may make use of either external benchmarks, which may be retrieved from an external benchmark database, and/or it may make use of internal benchmarks. As an example of an internal benchmark, FIG. 1 shows at stage 7 generation of a benchmark profile from analysis profiles for a group of drivers, for example from analysis profiles for a reference group of drivers.

Where one or more internal benchmark profiles are used at stage 8, the internal benchmark profile(s) are generated previously at stage 7, and stored in an internal benchmark database. If internal benchmarks are used, the process of generating the internal benchmarks at stage 7 in general will be required only once, although it may possibly be desirable to re-run stage 7 every so often in order to refine the internal benchmarks used, or to add new benchmarks and/or remove some benchmarks.

As one example, the driving behaviour of a driver who is known to have good driving behaviour, for example a driver with an advanced driving qualification, may be used as benchmark. In a related example, the benchmark may be based on the driving behaviour of a plurality of drivers who are known to have good driving behaviour.

As another example, the driving behaviour of one or more other drivers having approximately the same age, or the same length of driving experience, may be used as a benchmark. This allows the performance of a driver to be assessed specifically against a group of drivers of similar age/experience. Alternatively, the driving behaviour of one or more other drivers who drive the same make or model of vehicle may be used as a benchmark.

From the results of comparing the analysis profile for an individual driver with the benchmarks, the invention provides a results profile 28 for that driver, relative to the benchmarks. This results profile 28 may then be used to calculate a Score for the driver, at stage 9. The results profile may be output for display and/or may be stored in a database for future use.

It should be understood that FIG. 1 presents a broad overview of the present invention, and that not all stages of the method need be carried out at one time, nor by the same party. For example, the process of generating the behaviour-oriented map based on a digital road map, at stage 5, and deriving the metadata for the links of the behaviour-oriented map do not, in principle, need to be carried out by the same party who processes received vehicle motion data to generate a driver profile and driver scores. A party may process received vehicle motion data to generate the driver profile, and/or the driver scores using metadata for a behaviour-oriented map that has previously been generated and/or was generated by another party.

For example, FIG. 14 is a block schematic diagram showing the principal features of a method required to characterise the driving behaviour of a driver, and these features correspond generally to stage 3 of FIG. 1 (identify events), stage 4 of FIG. 1 (generate the driver profile), and characterising the driver's behaviour using the driver profile (for example according to one or more of stages 6, 8 and 9 of FIG. 1).

Similarly, FIG. 15 is a block schematic diagram showing the principal features of a method of generating the link indexes, and these features correspond generally to stage 5 of FIG. 1.

Similarly, FIG. 16 is a block schematic diagram showing the principal features of one method of characterising the driver's behaviour by determining a measure of the driver's performance, and these features correspond generally to stage 4 of FIG. 1 (generate the driver profile), stage 8 of FIG. 1 (comparison with a benchmark) and stage 9 of FIG. 1 (determining a measure of the driver's performance such as one or more driver scores).

Furthermore, in principle, it would even be possible for one party to perform stages 2, 3, and 4 of generating an individual driver profile, and for that party to make that driver profile available for other parties to analyse and score.

As a further example, the stage of comparing the driver profile with benchmarks at stage 8 may be carried out by the same party who has generated internal benchmarks at stage 7; alternatively it may make use of internal benchmarks that have been generated previously by another party.

Certain of the stages of the method will now be described in more detail.

Generation of Map Metadata (Stage 5)

The data provided by digital road map vendors to date has been organised around physical attributes. The segmentation of features is designed to maximise utility for applications such as journey planning. The result is a set of attributes that describe things like the importance of a road for routing traffic (eg, the "functional class" in NAVTEQ maps, or "functional road class" in Tele Atlas maps). The attributes supplied by digital map vendors are not designed to tell us about how driver behaviour is influenced by each section of road. A lightly-used section of motorway (eg in rural Cumbria) could have the same functional class as a very busy section of motorway (eg the M25 around London), but would feel very different to the driver travelling on it. To forecast how a person might drive on a section of road we need to know what features of that road influence driver behaviour.

The invention takes a different approach to digital mapping. We categorise elements of a road network based on the characteristics and invariants that influence drivers to behave in particular ways.

We take a geometrical representation of the road network with its associated physical characteristics. From this we generate a new driver-behaviour oriented map representation with attributes that are used to categorise driver behaviour, for example to characterise whether, and if so how, a driver brakes or accelerates when traversing a link or while transitioning from one link to another. As explained below, some information in the driver-behaviour oriented map may be derived from metadata in the original road map (such as link length), while other information is generated specifically for use in the invention.

The invention defines map features called links, and the map that we generate is a network of links, each link having a set of attributes called link indexes.

Links

The canonical element of the road network is the link. In the invention links are segments of the road network used by motor vehicles. They are represented geometrically by a series of connected latitude, longitude points. Each geometry point may optionally include altitude.

Links are terminated at each end by a junction. The geometry of the link defines a reference junction at one end of the link, and a non-reference junction at the opposite end. A link can be navigable to vehicles in either or both directions.

Links can be connected to zero or more different links at each junction. The combination of link connectivity and permitted direction of travel of the links results in a representation of the navigable road network.

Links each have a set of attributes called link indexes associated with them that describe the characteristics of the link in terms of how driver behaviour is influenced by the link.

It should be noted that a "link" does not necessarily correspond exactly to a road link of the digital map 20. For example if a road link contains a single-carriageway section and a dual-carriageway section, the single-carriageway section and dual-carriageway section may be treated as different links on the map generated at step 5, as a single-carriageway road has different driving characteristics to a dual-carriageway road.

Link Indexes

For each link the invention defines a number of link indexes, each of which is an attribute that influences the behaviour of a driver. Examples of possible link indexes include, but are not limited to:

Road Category
Link Length
Q Lane Count
Road Density
Junction Category
Road Curvature
Start-or-End-Point-Only Some of the link indexes may be derived from information in the original digital road map. In some cases, it may be possible to use information in the original digital road directly for example, if the digital road map contains information on lane count it may be possible to use this information directly since (in most countries) there are only a small number of possible values for lane count of a link. In most cases, however, information in the original digital road may well not be in form that is directly suitable for use in the present invention and needs to the processed, for example categorised in some way, before being used. For example, details of link length and possibly link curvature may be contained in the original digital road map but link length and/or link curvature can potentially take any value so that information in the road map on link length and/or link curvature may well not be in a form suitable for use in assessing driver behaviour, so that some processing may still be required. For example, links may be grouped, for example to define various ranges of link length or curvature, such as the example having 8 different ranges of link length given below, and classify each link into one of the ranges of link length and/or one of the ranges of link curvature.

Other link indexes used in the present invention are however not contained in the original digital road map, and are specifically constructed for use in the invention, using data in the digital road map and possibly using data from other sources (such as, for example, information on speed limits). These link indexes typically relate to features that are not relevant for navigation/routing purposes, and example of specifically constructed link indexes are junction category and road density Road Category The Road Category index classifies the relative importance of a link for routing and navigation between 1 and 5, where 1 would be a road such as an inter-urban motorway or trunk road, and 5 would be a minor rural or residential road.

Link Length

The length of the current road link influences driver behaviour in several ways. If a driver can see that a long stretch of road ahead has no junctions or other impediments they might increase their speed. Conversely a short link that terminates in a junction or has multiple side-roads might cause a driver to be more cautious. Longer stretches of road with no side connections are also less likely to be obstructed by drivers waiting to turn across oncoming traffic, or impeded by slower traffic that has just joined the carriageway.

In analysis of driver behaviour, information about the usual cruising speed of a drive can be derived from data obtained on relatively long links, since on a long link a driver will usually accelerate to their preferred cruising speed and maintain a speed close to that (assuming that the road is not heavily congested). Conversely, information about a driver's acceleration and braking habits is usually better derived from data obtained on relatively short links as these are more likely to require a driver to brake and accelerate.

Above a certain threshold the link length ceases to have a noticeable effect, for example a driver will probably behave differently on a 15 m link than a 3 km one, but will not usually behave differently on a 3 km link than a 5 km one.

The invention groups link lengths and assigns them a numerical index. The grouping and number of indexes can change depending on the application and/or upon the country in which the invention is to be applied. An example of assigning indexes to link lengths from a UK application is:

| Length Range (m) | Index |
| --- | --- |
| 0-30 | 0 |
| 30-78.125 | 1 |
| 78.125-156.25 | 2 |
| 156.25-781.25 | 3 |
| 781.25-1406.25 | 4 |
| 1406.25-1953.125 | 5 |
| 1953.125-2500 | 6 |
| 2500+ | 7 |

The Link Length index may alternatively also be calculated using percentiles. In this embodiment links are ordered by length, and links are allocated a Link Length index depending on their position in this ordering. e.g. for a 10-point Link Length scale the shortest 10% of links would have index 0, and the longest 10% of links would have index 9.

Lane Count

Driver behaviour is influenced by the number of lanes available in the direction of travel. On a single carriageway (the most common) drivers can only travel as fast as the vehicle in front unless they overtake, and the ability to overtake depends on many factors. On a multiple carriageway road drivers can overtake much more easily and progress at their preferred pace, until the level of congestion increases to the level where the driver's behaviour is again restricted by surrounding vehicles.

We assign an index to the number of lanes that a road has in the direction of travel:

| Number of Lanes in Direction of Travel | Index |
| --- | --- |
| 1 | 1 |
| 2-3 | 2 |
| 4+ | 3 |

Road Density

The road density index characterises the relative number of road links within a given area surrounding a link compared with other links in the map.

Short range Road Density indexes (100 m-500 m) are a measure of the number of road links that a driver can physically see or directly influence traffic in the immediate location.

Medium and long range Road Density indexes are a measure of how the topology of the road network influences driver behaviour in a more general sense. They can indicate how metropolitan the region surrounding the link is.

Road densities are described using a diameter. To calculate the Road Density indexes for all the links in a map at a given diameter we:

For each link in turn we count all the links that lie within a circle centred on the link.

Determine the link with the maximum count

Figure 2:
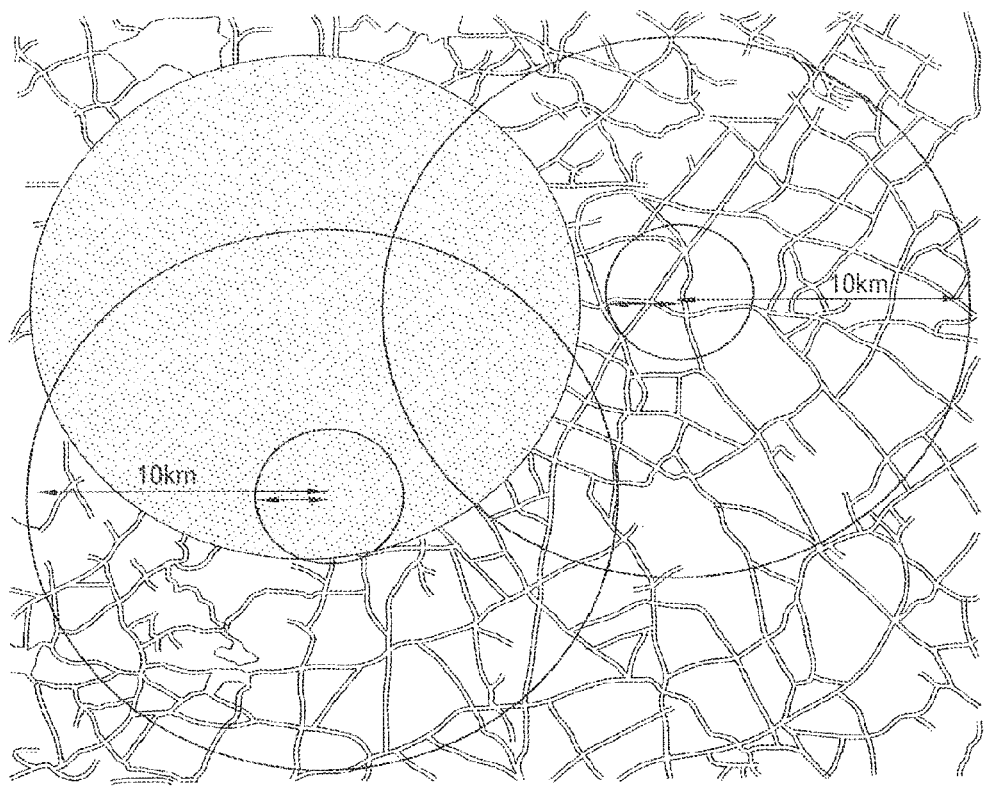
FIG. 2 shows two locations having different road densities.

For each link in turn convert its count to an index by scaling based on the maximum count FIG. 2 shows a large urban area with smaller, more rural villages surrounding it. Two areas are shown with circles of 2.5 km and 10 km radius. The number of road links lying within the 2.5 km circles is similar for both areas, but the number of road links within the 10 km radius is very different.

By combining a short range index with a longer range Road Density index we can forecast the effect of the two different influences on the road link.

Road Density Scaling

We can convert link counts to Road Density indexes in more than one way, depending on the application. The resolution of the index can be chosen to fit the application, common scales are an 8-point index (values 0-7) or a 32-point index (values 0-31).

The simplest method is linear scaling, in which a link is allocated an index in proportion to its count compared with the maximum count. For example if the maximum count in a 100-meter scale is 100 links, and we are calculating a 10-point index, then a link with a count of 35 would be given an index of 3, and a link with a count of 72 would be given an index of 7.

Road Density indexes can also be calculated using percentiles. All links are ordered by link count at that density scale, and allocated an index based on their position in this ordering. For example, for a 10-point Road Density index at 100 m the 10% of links with the fewest links in a 100 m diameter circle around it would have index 0, and the 10% of links with the greatest number of links within the 100 m diameter circle would have index 9.

Junction Category

A junction is:

the point at which two or more links meet the end of a Start-or-End-Point-Only link The invention does not define junctions as standalone entities in its map representation. The junction is only of interest in the way it affects driver behaviour on the adjacent links.

The characteristics of a junction are captured as a pair of Junction Category indexes, one for each end of each link. The Junction Category index at each end of a link is independent, and is not necessarily the same even for two adjacent links where they share a junction.

Figure 3:
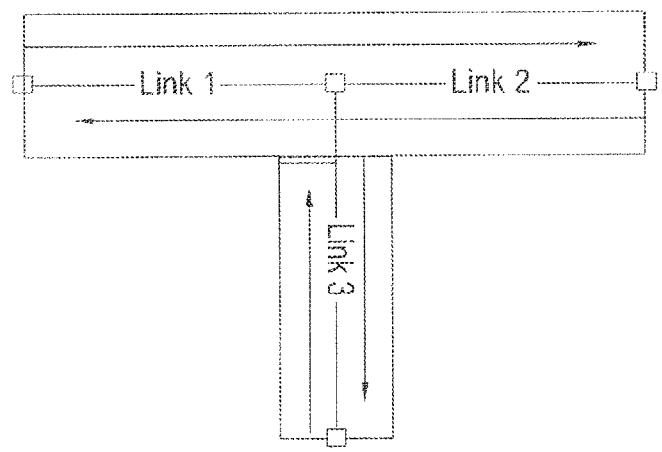
FIG. 3 is a schematic view road junction.

As an example, FIG. 3 shows a T-junction comprising three links. Links 1 and 2 are the continuation of a road with no restrictions on forward travel, and the perpendicular link 3 is either a stop or give-way, at an oblique angle. The way the junction influences driver behaviour depends on which link the driver is using to approach the junction.

If the driver approaches the junction using link 1 or link 2 and is travelling straight on, there will be little influence on forward travel from the junction unless there is activity at the junction (e.g. a vehicle pulling out).

If a driver approaches the junction using link 3 then there are multiple influences on behaviour. The driver does not usually have right of way at the end of the link, and must slow down. The angle between the current link and the two other links will affect the speed of any manoeuvre.

Types of Junction Category Index

| Name | Description |
| --- | --- |
| Priority | The driver has priority at the junction in the direction of travel |
| Give-way | The driver must defer to traffic on other links of the junction, or there is no connectivity at the end of the link (dead-end) |
| Roundabout | The link is part of a roundabout |

Every link has two Junction Category indexes, one for each end. The Junction Category index can be different at each end of a link.

How Junction Category Indexes are Allocated

Priority

Figure 4:
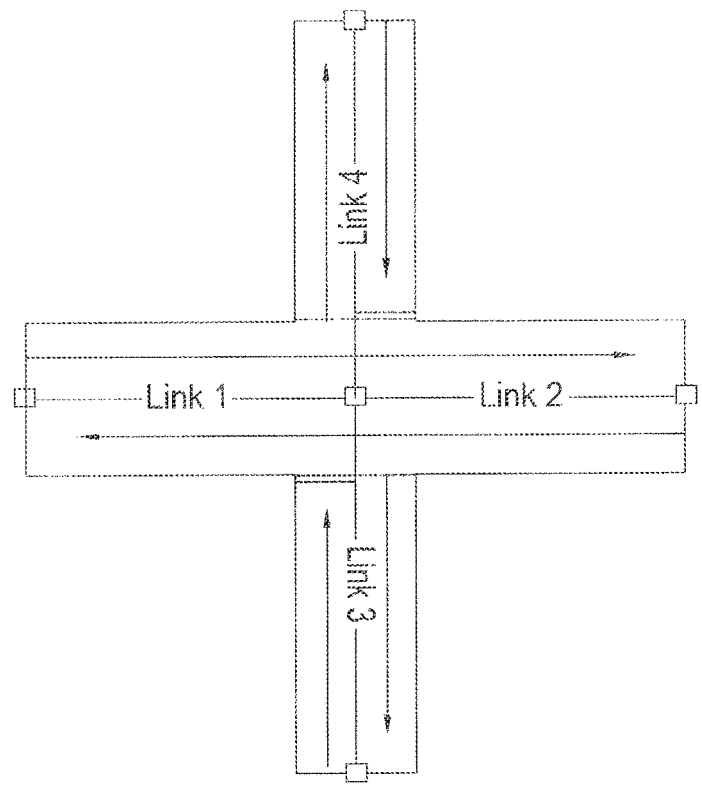
FIG. 4 is a schematic plan view of a road junction.

FIG. 4 shows four links meeting at a single junction. Links 1 and 2 are more significant roads, and links 3 and 4 more minor. Traffic on Links 1 and 2 has right of way at the junction; their Junction Category index for the link end at this crossroads is priority.

The entrance-end of a one-way street is given the priority Junction Category index, because there is no traffic in the opposing direction so traffic can join the link unimpeded.

A link end is given the priority Junction Category index if it has only one other link connected to it.

Give Way

In the crossroads of FIG. 4, a vehicle on link 3 or link 4 must give-way to traffic on links 1 and 2 whether it wants to join link 1 or 2 or cross to link 4. The Junction Category index for links 3 and 4 at the crossroads end is give-way.

Links joining roundabouts (but not part of the roundabout) are given the give-way Junction Category index at the end that joins the roundabout.

Roundabout

Links that are part of a roundabout are given the roundabout Junction Category index at both ends.

Road Curvature

The curvature of a road has a large influence on driver behaviour. The radius of curvature is a major factor affecting how fast a driver can take a bend. This information enables us to measure and assess braking behaviour when drivers travel around bends.

Large changes in direction in a short length of road link will cause vehicles to travel more slowly.

We use the link geometry and calculate the sum of all angles as the link direction changes. We use the Road Curvature index combined with the Link Length index as a measure of curvature per unit length of road link. The values assigned to different amounts of curvature are application-specific, an example is given below,

| Total Curvature (degrees) | Index Value |
| --- | --- |
| 0-40 | 0 |
| 40-100 | 1 |
| 100+ | 2 |

Start-or-End-Point-Only

This index denotes whether a link can be an intermediate part of a contiguous vehicle journey, or can only be the start or end point.

If a bidirectional link has no vehicular connectivity at one end then it is a dead end or cul-de-sac. We call this start-or-end-point-only as the link is not useful as an intermediate part of a single journey.

A unidirectional link cannot be a start-or-end-point-only, because it must be possible to join the link at one end in order to exit it at the other.

Transitioning Onto a Link

As noted, in some embodiments the invention generates one or more link indexes that relate to attributes that influence the behaviour of a driver transitioning onto a link (that is, joining a link), such as whether a driver may have turned to join a link, or may merge into a lane of traffic. Such a link index may be derived from the topology of the road network. The Junction Category index described above is one example of a link index that relates to attributes that influence the behaviour of a driver joining a link.

In general, the behaviour of a driver approaching a junction is likely to depend on the link on which the driver is approaching the junction. For example, in the case of the T-junction shown in FIG. 3, a driver approaching on link 1 may pass straight through onto link 2 or turn right onto link 3, a driver approaching on link 2 may pass straight through onto link 1 or turn left onto link 3, while a driver approaching on link 3 must stop, or at least give way, before turning right onto link 2 or left onto link 1. Thus, it is expected that a driver approaching on link 3 will show a "low braking event" (that is, brake a low speed), as a consequence of the need to stop or give way before turning left or right. A driver approaching at a safe speed on link 1 intending to travel through the junction onto link 2 would not however need to brake (assuming that the links are not sharply curved), unless they were obstructed by another vehicle (for example one that was braking before turning or waiting to turn). Accordingly, driver behaviour would be expected to vary, depending on which link the driver was approaching the T-junction.

A conventional digital road map does not include information relating to the behaviour of a driver approaching a junction, as this is not relevant for navigation/journey planning. Link indexes relating to factors that influence the behaviour of a driver approaching a junction, such as the Junction Category Index, are created specifically for use in the present invention.

Filtering (Stage 2)

Different data sources have different characteristics. These characteristics may manifest themselves in many ways, e.g.:

taking a long time to acquire GPS lock being prone to drop-outs or reflections having low sensitivity, resulting in seeing fewer satellites than other devices The cause of these differences might be fundamental, e.g. different GPS chipsets or poorer quality circuitry. It might be environmental, e.g. a driver might routinely install the GPS unit with a restricted view of the sky. It might also be due to factors such as prevailing weather conditions or obstructions such as tree cover or tall buildings.

The aim of the source-specific filtering stage, stage 2 of FIG. 1, is to normalise input data to the greatest extent possible so that we can make comparison between data from different sources. We try to eliminate unreliable data from our processing stages, and improve the stability of data that we suspect of being impacted by noise or interference.

The nature of the filtering applied may vary with the type of event that is to be identified at stage 3. Some events require no filtering at all of the incoming data, some events may require simple thresholds to be applied, and some events may require more complex filtering.

Eliminating Bad or Unreliable Data

Where we have access to detailed GPS source data such as the raw NMEA stream from the GPS chipset, we can filter the source data comprehensively using a variety of measures.

Validity Some NMEA sentences include a status field that indicates data validity. Invalid data can be dropped.

Satellites We can choose to drop data that is based on observations of a low number of satellites xDOP The various Dilution of Precision (DOP) values can be used to drop data that has a DOP value that is too high (e.g. insufficient precision)

Slow GPS fix If a device takes a significant amount of time to acquire a GPS fix, we can ignore the first part of each track to reduce the probability of inaccurate data Example—A Simple Speed-Change Filter One example of a simple is a filter in which all data points containing a speed between the minimum and maximum, and that have changed by less than a threshold since the previous data point are passed through to the event detection stage. All other data points are blocked. One example of characteristics for such a filter is:

| Threshold | Value |
|---|---|
| Minimum allowed speed | 1 pkh |
| Maximum allowed speed | 200 kph |
| Maximum speed change between data points | 30 kph |

Improving Noisy Data

In addition to filtering out low quality data, stage 3 of the method of FIG. 1 may also comprise applying one or more pre-processing stages to the data received from the vehicle, for example to increase the signal-to-noise ratio of the data. One of the techniques the invention may use to improve noisy data is to apply a Kalmar? filter. The Kalman filter uses knowledge of the behaviour of the physical system (i.e. the equations governing the movement of a car) to improve estimates of position and speed.

Event Identification (Stage 3)

In the invention an Event is the canonical unit of driver behaviour that we identify in a set of driver data. An Event is the characterisation of a discrete driver action or manoeuvre (e.g. accelerating up to cruising speed, or travelling around a corner) along with its associated metrics.

Each event has a type, a time code with identifies the time, and optionally date, at which the event occurs, a Link ID and some Event Metrics. The Event Type is a description of the discrete driver action or manoeuvre (e.g. accelerating up to cruising speed, or travelling around a corner). The Event Time is the time at which the Event occurred. The Event Link ID is the unique Link ID of the link behaviour-oriented map 20 on which the event occurred. The Event Metrics are always a set of measurements that characterise the Event. The measurements that make up the Event Metrics are event dependent and are described more fully below.

There are many different events that the invention may recognise at stage 3 of the method of FIG. 1. The basic strategy used to identify events is the same for all types of event.

Figure 5:
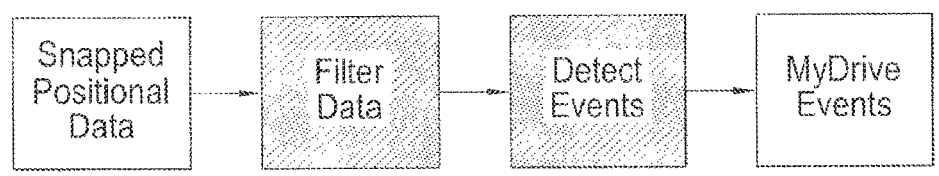
FIG. 5 is a schematic flow diagram illustrating the identification of events in a driver behaviour.

FIG. 5 is a block flow diagram showing principal steps of the event identification stage. As explained above the input to the event identification process is positional data from a vehicle. that has been associated with (or "snapped onto") a road link of the behaviour-oriented map 20. As also explained above, the positional data from the vehicle may be filtered to make it suitable for event detection. The nature of this filtering varies with the type of event we are looking for. Some events require no filtering at all, some require simple thresholds to be applied, and some require more complex filtering.

Next, events of one or more different types are identified by examining the data, looking for characteristics that match the event in question. When we match a pattern in the data we emit an event of the relevant type, along with its characteristics and the link id from the digital map that the event took place on.

The result of the process of FIG. 5 is a list of events, their associated characteristics, and their associated link id. These events characterise interesting and notable behaviours of the driver during the journey(s) covered by the input data.

Common Event Information

All events of whatever type are associated with a link id of a link of the behaviour-oriented map 20.

Most of the events, familiarity events being the exception, are also associated with a time code. A time code is derived from a date and time, for example by assigning a number between 0 and 6 for the day of the week (where 0 is Sunday), a number between 0 and 23 for the hour of the day and quantising the minutes to give a number which is either (0, 15, 30 or 45). So in this example the date and time "2010-05-05 18:12:00" which happens to be a Wednesday would be assigned the time code "3:18:00" and the time code "6:12:00" would be assigned to an event that took place on a Saturday sometime between midday and quarter-past.

As noted above, an event is also associated with at least one event "attribute" (also referred to as an event "metric"). One or more of the event attribute(s) may be used in selecting some events for use in analysis while excluding other events from use in further analysis.

Speed Events

Speed events are one of the simplest events and represent the instantaneous speed of the vehicle at each data point.

We emit one speed event for each data point that arrives at the detector. The event contains the link id, time code, and for its event metric it includes speed in kph.

Acceleration Events

An "acceleration event" represents a meaningful increase in the speed of the vehicle from one speed to a higher speed. Small changes in speed are not recorded.

We emit an acceleration event when we observe that the speed of the vehicle has increased by more than some threshold (defined by the "minimum total change in speed).

Figure 6:
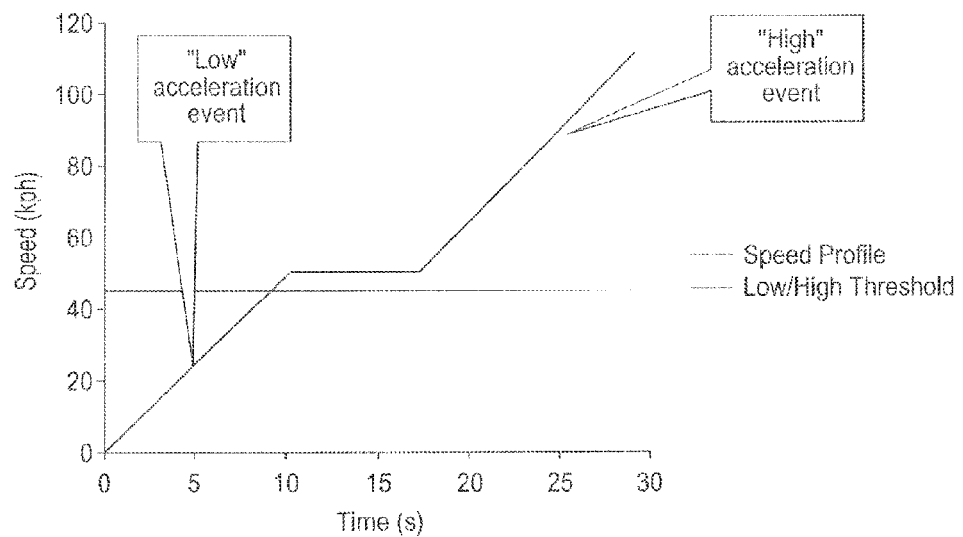
FIG. 6 illustrates the identification of an "acceleration event"

An acceleration event may be classified according to a vehicle speed associated with the event. In a simple example, if the start speed of the event is below a threshold then we nay classify the event as a "low" acceleration event, e.g. a standing start or acceleration away from junction. If the start speed of the event is above the threshold then we classify the event as a "high" acceleration event, e.g. accelerating up to major road speeds after cruising at residential speeds. FIG. 6 shows speed plotted against time, and indicates a "low" acceleration event and a "high" acceleration event. In FIG. 6 the threshold between a "low" acceleration event and a "high" acceleration event is set at approximately 45 kph, but the invention is not limited to this.

The invention is also not limited to a single threshold speed, and it is possible for there to be two or more threshold speeds so that an acceleration event may be classified into one of three or more speed classes.

One possible set of parameters for defining an acceleration event might be as follows:

| Parameter | Value |
| --- | --- |
| Minimum total change in speed | 10 kph |
| Maximum start speed for "low" events | 45 kph |
| Minimum start speed for "high" events | 45 kph |
| Minimum duration of acceleration event | 35 seconds |
| Maximum duration of acceleration event | 200 seconds |

The speed of the vehicle must increase by at least 1 kph each second. To put this in context, it is equivalent to a 0-100 kph time of 1 minute 40 seconds, a rate of acceleration that even highly fuel efficiency minded drivers are likely to drop below.

We emit one acceleration event for each increase in speed that satisfies the thresholds. The event contains the link id of the first data point that forms the event, the time code of the first data point, the type of acceleration event (that is, "high" or "low"), and, as the Event Metric associated with an acceleration event, the maximum acceleration in kph/s detected during the event.

Braking Events

A "braking event" represents a meaningful decrease in the speed of the vehicle from one speed to a lower speed. Small changes in speed are not recorded. We emit a braking event when we observe that the speed of the vehicle strictly decreases by more than a threshold.

Figure 7:
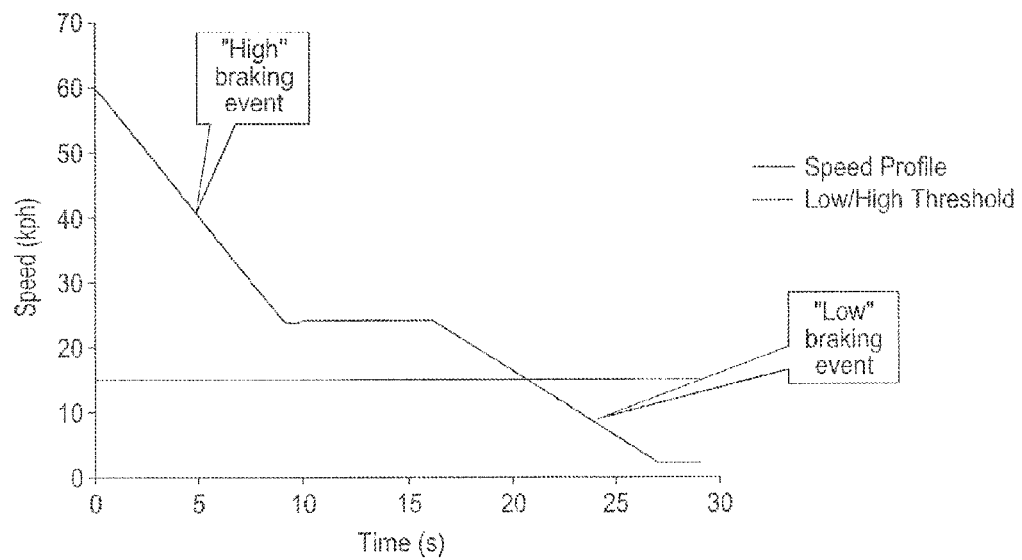
FIG. 7 illustrates the identification of a "braking event"

A braking event may be classified according to a vehicle speed associated with the event. In a simple example, if the final speed of the event is above a threshold then we may classify the event as a "high" braking event, e.g. reducing speed when moving from a major road to a residential road with a lower speed limit. If the final speed of the event is below the threshold then we classify the event as a "low" braking event, e.g. coming to a standstill, or approaching a junction where the vehicle may have to stop. FIG. 7 shows speed plotted against time, and indicates a "low" braking event and a "high" braking event. In FIG. 7 the threshold between a "low" braking event and a "high" braking event is set at approximately 15 kph, but the invention is not limited to this.

The invention is also not limited to a single threshold speed, and it is possible for there to be two or more threshold speeds so that a braking event may be classified into one of three or more speed classes.

One possible set of parameters for defining an acceleration event are as follows:

| Parameter | Value |
| --- | --- |
| Minimum total change in speed | 10 kph |
| Maximum final speed for "low" events | 15 kph |
| Minimum final speed for "high" events | 15 kph |
| Minimum duration of acceleration event | 35 seconds |
| Maximum duration of acceleration event | 200 seconds |
| Minimum decrease in speed each data point | 1 kph |

The speed of the vehicle must decrease by at least 1 kph each second.

We emit one braking event for each decrease in speed that satisfies our thresholds. The event contains the link id of the last data point that forms the event, the time of the last data point, the type (high or low), and, as the event metric, the maximum deceleration in kph/s detected during the event.

Cornering Events

A "cornering event" characterises the behaviour of a driver when navigating a corner fast enough that their choices have an impact on the stability and safety of the vehicle. Very gentle corners (high radius of curvature) can in general be driven safely at higher speeds than tight corners (low radius of curvature).

When cornering, it is important that a driver keeps the vehicle balanced. A moving vehicle is most stable when its weight is evenly distributed, moving in a straight line at constant speed (*Roadcraft*, ISBN 978 0 11 702168 6). When a driver steers, the forces that change the direction of the vehicle come from the friction between the front tyres and the road surface. Accelerating, braking and steering all reduce tyre grip, so the more a driver brakes or accelerates during a corner the less tyre grip is available for steering.

The invention uses multiple measurements of vehicle speed and position to categorise the driver's behaviour during cornering.

Figure 8:
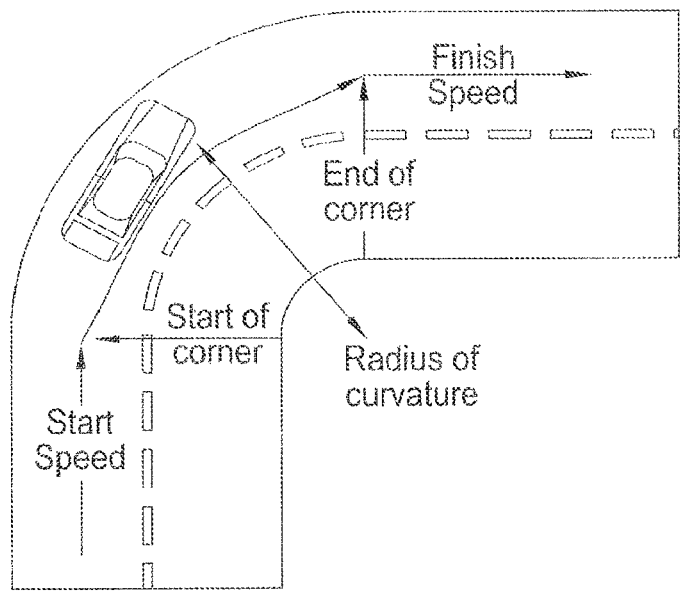
FIG. 8 is a schematic view of a motor car negotiating a corner in a road.

The invention emits a cornering event when the positional data shows that the vehicle has travelled around a corner of interest. FIG. 8 is a schematic plan view of a vehicle negotiating a corner in the road.

A cornering event begins when the vehicle is travelling above a minimum speed threshold, the direction of turn of the vehicle (the winding direction) is the same for two consecutive points, and the radius of curvature at the second point is between the minimum and maximum thresholds. The winding direction and radius of curvature are recalculated at each subsequent data point.

The cornering event ends when the direction of winding changes, the radius of curvature is no longer between the thresholds or the vehicle speed drops below a minimum threshold. A minimum of three positional data points are required for a cornering event.

The following further conditions must be satisfied before the event is considered valid:

The maximum change in the bearing of the vehicle must be at least equal to the minimum winding angle.

The radius of curvature at each point, with the exception of the first and last, must be less than the maximum permitted radius of curvature.

The radius of curvature at each point must be greater than the minimum permitted radius of curvature.

The winding must never exceed the maximum permitted winding angle.

When the winding direction changes, the change in the winding must not exceed the maximum permitted change in winding angle.

The minimum and maximum per ted radii of curvature at each point are defined as functions of the speed at that point. The minimum radius ($r_{min}$) and the maximum ($r_{max}$) are defined by the relationships:

$$r_{min}: R_{min} < r_{min} = v^2/\mu g < R_{max}$$

$$r_{max}: R_{min} < r_{max} = 3r_{min} < R_{max}$$

where v is the speed of the vehicle in meters per second, μ is approximation to the best-case coefficient of friction between a slick car tyre and a dry road (0.9) (Jones & Childers, *Contemporary College Physics*, McGraw Hill), and g is acceleration due to gravity at the earth's surface.

In these relationships, Rmin and Rmax are thresholds. If the value of $r_{min}$ calculated according to $r_{min} = v2/\mu g$, or the value of $r_{max}$ calculated according $r_{max} = 3rmin$, is less than Rmin meters, it is set to Rmin meters, and if it is more than Rmax meters it is set to Rmax meters. These thresholds filter out phantom cornering events that are the result of noise in the positional data. Thus, the maximum permitted radius of curvature at a given speed is defined as the lesser of three times $r_{min}$ at that speed or $R_{max}$ meters.

One example of parameters for a cornering event could be:

| Parameter | Value |
| --- | --- |
| Maximum time between consecutive points | 1 s |
| Minimum corner entry speed | 10 kph |
| Minimum cornering speed | 5 kph |
| Minimum radius of curvature Rmin | 5 m |
| Maximum radius of curvature Rmax | 75 m |
| Minimum winding angle | 30 degrees |
| Maximum winding angle | 60 degrees |
| Maximum change in winding angle | 40 degrees |

We calculate the maximum deceleration measured over all time durations (of length specified by the time interval parameter) during the event. In some embodiments the invention does not emit events (that is, does not make use in analysis) where the vehicle does not decelerate (or accelerate) at all while cornering, since a driver traversing a corner at a constant speed is of lesser interest for driver behaviour.

The cornering event emitted contains the link id of the last data point that forms the event and the time of the last data point of the event. The event metric associated with the event is the maximum deceleration detected during the event.

Where a cornering event is accompanied by deceleration, this may be referred to as a "braking while cornering" event. Such an event is a particular type of braking event, and may be used to characterise the behaviour of a driver since navigating, or entering, a corner at a speed that is too high for the stability and safety of the vehicle with the consequent need to brake while navigating the corner is often indicative of a driver who is late in making the decision when to brake for the corner. This is particularly likely to be true of a "braking while cornering" event which ends with the vehicle still travelling at a high speed, as this suggests the driver has reduced their speed as a consequence of the corner (whereas a braking while cornering" event which ends with the vehicle travelling at a low speed might suggest that driver has encountered an obstruction).

A "braking while cornering" event may be considered as the combination of a braking event and a cornering event— the braking event and the cornering event coincide, or at least overlap, in time and location.

Conversely, where a cornering event is accompanied by acceleration, such an event may also be used to characterise the behaviour of a driver since smooth acceleration out of a corner is often a characteristic of an advanced driver. Such an event may be considered as a particular type of acceleration event.

Familiarity Events

A "familiarity event" is one of the simplest events, and records that the vehicle has driven on a specific road link on a given day.

We emit one familiarity event for each change of road link id detected in the input data. The event contains the link id and a number representing the unique day that the data point is from. For a familiarity event the link id and day also act as the Event Metrics.

If we observe a driver on the same link id multiple times in one day then we eliminate duplicates during the combining stage (see section "Combine Events by Link ID"). This gives us a maximum of one familiarity event per road link id per day.

Distance Events

A "distance event" is a means of estimating the total distance that a vehicle has covered. Each distance event sums the distance travelled by a vehicle over a contiguous series of input data points. The sum of a series of distance events is the total distance travelled.

We emit one distance event when we detect a discontinuity in time or location in the data stream. A distance event contains the total distance travelled for the valid data of that event. If the distance between two data points appears to be such that the vehicle would have to travel at an unrealistic speed, then we distrust those data points and treat them as a discontinuity in location

| Threshold | Value |
| --- | --- |
| Maximum allowed effective speed between data points | 200 kph |

A distance event has for its Event Metrics the total distance travelled for the valid data of that event.

Driver Profiles (Stage 4)

Figure 9:
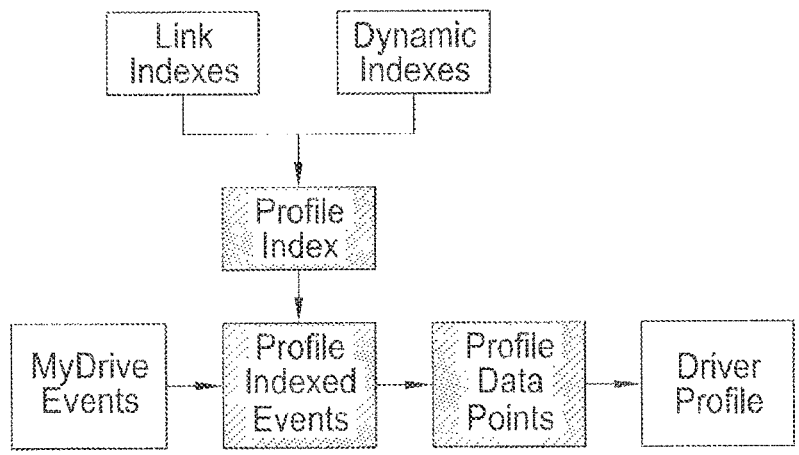
FIG. 9 is a schematic flow diagram illustrating generation of a driver profile.

As explained above, the output from stage 3 of the method of FIG. 1 is a set of events for a driver, with each event having a time, an event type, at least one event attribute (or event metric), and an associated link ID that identifies the link on which the event occurs. At stage 4 of the method of FIG. 1, these events are used to generate a Driver Profile for the driver. FIG. 9 illustrates the principal steps of generating a Driver Profile.

Initially a Profile Index is generated for each Event, as stage 1 of FIG. 9. The Profile Index of an event is generated from the link ID and time/date associated with the event, and a Profile Index is a combination of the Link Indexes 22 for the event, and any Dynamic Indexes. The Link Indexes for an Event are simply the Link Indexes for the Link ID that is associated with that Event. These indexes are a property of the link. The Dynamics Indexes for an Event are a function of the driver, the link and the time. The Dynamic Indexes we typically use are Familiarity and Time. Other types of Dynamics Index can be used, such as the congestion status of a link or what the weather was like at the time of the event. The Profile Index is an aggregation of link indexes for the appropriate link and any dynamic indexes.

The Familiarity Index tells us whether the driver was familiar e link on which Event occurred at the time the Event occurred.

The invention uses a driver's Familiarity Events to maintain a record of which links and on what day the driver has been observed. If the driver has been observed to use a link often and recently (compared with the time of the Event in question) then we say that the Event occurred on a Familiar link. If the driver has been observed not to use a link often, or has not been observed on the link recently then we say that the Event occurred on an Unfamiliar link. The Familiarity Index is a Boolean flag, indicating whether a driver is seen regularly on a particular link. It is conveniently represented by a number, for example where 1 means the driver was familiar with the link at the time of the Event, and 0 means unfamiliar.

The thresholds we use to determine familiarity can be adjusted to suit the context in which it is used. Typically we would say that a driver is considered familiar with a link if they have been observed on that link on at least 10 different days in the year prior to the Event, and at least once within the previous 28 days. If they have been seen fewer than 10 times in the previous year or were last seen more than 28 days prior to the Event it would be classed as unfamiliar.

The Time Index is a numerical code that denotes the time of the day and day of the week on which an Event occurred.

As explained above, it may be desired to select some events for use in analysis and to exclude other event, based on one or more attributes of the events. This selection can in principle be made at any point in the analysis process. It may be computationally more efficient if the selection of events is made before the step of generating the profile index as described above so that a profile index is not generated for an event that is not used in subsequent analysis. It is however possible in principle to generate a profile index for each attribute, and subsequently select events.

The allocation of numerical codes can be changed to suit different customer requirements. An example is shown below. In this example the codes are used to categorise peak and off-peak weekday periods, and also late-night Friday and Saturday periods which are recognised as times of higher risk of accidents.

| Time Range | Sun | Mon | Tue | Wed | Thu | Fri | Sat |
|---|---|---|---|---|---|---|---|
| 00:00-04:30 | 9 | 0 | 0 | 0 | 0 | 0 | 8 |
| 04:30-06:30 | 10 | 1 | 1 | 1 | 1 | 1 | 10 |
| 06:30-09:30 | 10 | 2 | 2 | 2 | 2 | 2 | 10 |
| 09:30-16:00 | 10 | 3 | 3 | 3 | 3 | 3 | 10 |
| 16:00-19:00 | 10 | 4 | 4 | 4 | 4 | 4 | 10 |
| 19:00-22:00 | 10 | 5 | 5 | 5 | 5 | 5 | 10 |
| 22:00-00:00 | 10 | 6 | 6 | 6 | 6 | 7 | 9 |

Each event selected for analysis is then indexed with its appropriate profile index at step 2 of FIG. 9, to convert those of a driver's Events that are selected for further analysis into Profile Indexed Events.

A "Profile Indexed Event" has an associated event type and event metric; however, rather than having an associated time/date and link ID, it has an associated profile index which identifies one or more characteristics of the event such as road type and/or road category, weather conditions etc. That is, at this point we have a set of events where each event (or event aggregate) is associated with a profile index (instead of a specific link id and time code). Many events will share a common profile index. This fact is important as it allows us to compare the everyday behaviour of drivers who drive on similar types of roads under similar conditions, regardless of where exactly they drive.

Next, at stage 3 of FIG. 9, all Profile Indexed Events with the same Profile Index are aggregated into a single Profile Data Point. A Profile Data Point is an aggregation of all Profile Indexed Events that share the same Event type and Profile Index.

To create a Profile Data Point from the set of all Profile Indexed Events the Profile Indexed Events are grouped by Event type and Profile Index. For each group of Profile Indexed Events that share the same Event type and Profile Index we combine their Event Metrics to give a single set of statistics characterising the Event Metrics of all the constituent Events.

Event Metrics from multiple similar events can be combined to give a set of statistical measures that characterise the distribution of the Events as a whole. There are many ways that this can be done, and the best way depends on the nature of the Event Metrics, and the purposes to which the Profile Data Point Metrics will be put. An example using mean and standard deviation is shown below Example—Combining Profile Data Points Given three profile indexed speed events with the following characteristics:

| Type | Link Indexes | Familiarity Index | Time Index | Speed(kph) |
|---|---|---|---|---|
| Speed | 123456 | 1 | 2 | 40 |
| Speed | 123456 | 1 | 2 | 45 |
| Speed | 123456 | 1 | 2 | 50 |

We can combine these events to give us a single Profile Data Point with the following characteristics:

| Type | Link Indexes | Familiarity Index | Time Code | Count | Mean Speed(kph) | Std Dev of Speed |
|---|---|---|---|---|---|---|
| Speed | 123456 | 1 | 2 | 3 | 45 | 4.0825 |

The Event Metrics for the Speed events consist only of the speed value. The Profile Data Point Metrics for the combined events consists of the count, mean and standard deviation of the constituent Event Metrics.

In this example the mean and standard deviation are calculated for a set of Profile Indexed Events and used as the Profile Data Point Metrics. Other statistical measures can be calculated and used as Profile Data Point Metrics such as maxima, minima, percentiles and skewness.

The Driver Profile is then generated from the Profile Data Points for a driver. The Driver Profile is the complete set of Profile Data Points generated for that driver, by processing all the driver's events. The Events are grouped and aggregated, so we would normally expect significantly fewer Profile Data Points in a Driver Profile than the Events used to create it.

The Driver Profile can be stored as a plain text or binary file containing Profile Data Point details, or it can equally well be loaded into a database for analysis.

A driver profile is usually generated for specific time period—for example, a monthly driver profile may be obtained from the events collected for a particular driver over the course of one month.

As an example, a sample section of a driver profile may look as follows:

| | Profile Index | | | Statistics | | |
|---|---|---|---|---|---|---|
| Event type | Link Index | Time Index | Familiarity Index | Count | Mean | Standard Deviation |
| Acceleration High | 513130 | 3 | 1 | 13 | 4.500 | 0.408 |
| Acceleration Low | 413131 | 4 | 1 | 5 | 3.325 | 0.250 |
| Acceleration Low | 313131 | 8 | 0 | 3 | 5.25 | 0.984 |
| Speed | 513130 | 3 | 1 | 80 | 50.2 | 7.424 |

-continued

| | Profile Index | | | | | |
|---|---|---|---|---|---|---|
| | | | Famil- | Statistics | | |
| Event type | Link Index | Time Index | iarity Index | Count | Mean | Standard Deviation |
| Braking High | 224341 | 2 | 0 | 1 | 3.2 | 0.000 |
| Cornering | 311230 | 10 | 0 | 1 | 2.162 | 0.000 |

We see that associated with each event type and profile index is a statistic consisting of a count, a mean value of some metric and the standard deviation of the metric. The metric is the same one as used for the event type from which the profile entry has been derived, e.g. for speed events it refers to a speed in kph.

Since we can easily combine profiles of this form together, a profile for a driver can be up-dated whenever new data arrives. It can also be compared with another profile by looking at the statistics in each profile associated with the event and profile index of interest. Thus, a driver's profile may be compared with an earlier profile for that driver to monitor the results of training, or a driver's profile may be compared with a profile for another driver.

For example, we can take all events associated with a specific driver during one calendar month and create a basic one-month profile. If we wish, three of these monthly profiles can be combined to produce a quarterly profile, or twelve to create an annual profile. We can then generate and compare scoring metrics derived from these various profiles to detect, for example, whether a driver's behaviour has changed markedly from their behaviour a few months ago, or if it has recently improved from their typical behaviour over the past year.

Another important possibility is that profiles for different drivers can be combined, for example generating a single profile which measures the typical behaviour of a group of expert drivers. In fact doing so is fundamental to the way in which an embodiment of the invention generates driver scoring metrics.

Stages to Generate Driver Scores From Profiles

This section describes the stages in generating a profile-based driver score (stages 6-9 of FIG. 1).

The "Driver Profile" 24 contains many hundreds of different "absolute" measurements of driver behaviour under a wide variety of different circumstances. While it is in principle possible to compare full driver profiles, the amount of data in a driver profile means that this may be computationally-intensive in practice. In many cases, it is desirable to characterise the Driver profile in some way, or to extract certain information from the full driver profile, to make the task of comparing driver profiles easier. This section describes one possible method and configuration for drawing particular conclusions about driver behaviour and scoring them based on information contained within a Driver Profile.

Scoring Process Overview

This method involves extracting from the Driver Profile, measurements of very specific events, for example speed, braking and acceleration events, against a variety of different road contexts. Specific Profile Data Point Metrics are selected and combined to generate the "Analysis Profile" 25 for an individual driver. This new profile containing an individual's unambiguous measurements of behaviours may then be compared to a "Benchmark Profile" and conclusions are then formed based on this comparison and stored in the "Results Profile" 28. Typically the Benchmark profile represents measurements from an ideal or preferred driver or group of drivers. This method is broken down into several stages;

1. Create Analysis Profile from Driver Profile for an individual driver.
2. Compare Analysis Profile with Benchmark Profile and generate Results Profile
3. Generate driver scores based on information in Results Profile Generate the Analysis Profile—stage 6 of FIG. 1

The first stage of the scoring process is to generate the Analysis Profile for an individual driver. This profile should contain unambiguous driving measurements so that comparisons and conclusions can be drawn from the information within it. To achieve this, only selected information is taken from the Driver Profile. The selection of relevant Profile Data Points is controlled by the Analysis Index 26.

The Analysis Index 26 determines the subset of the Profile Index that should be used for scoring. If a high granularity Profile Index is collapsed into a lower granularity Analysis Index, data is combined and new metrics are calculated. For instance, if the Profile Index specifies 7 different road link length types (as in the example above), but the Analysis Index only specifies 2 link length types (as in the table below) then the Profile Data Point Metrics need to be combined correctly to achieve the new granularity.

The following table shows an example of an Analysis Index definition.

| Name | Type 0 | Type 1 | Type 2 | Type 3 |
|---|---|---|---|---|
| Road Length | Less than 78 M | More than 78 M | | |
| Road Curvature | Dead straight | Road with bends | | |
| Junction Type | Give Way | Through Road | | |
| Road Type | Trunk/ M Way | Major/ A Road | Minor/ B Road | Local Road |
| Road Setting | Rural | Sub-urban | Urban | |
| Familiarity | Unfamiliar | Familiar | | |
| Time of Day | Off-Peak | Peak | | |

All of the event types from the Driver Profile are processed according to the Analysis Index. These events include;

Speed events
Braking in corners events
Braking to low speeds events
Braking to high speeds events
Acceleration from a low speed events
Acceleration from a high speed events The combination of the Analysis Index and Events means that specific measurements are available in relation to interactions between the driver and the underlying road network and other external conditions.

Compare the Analysis Profile with the Benchmark Profile and generate the results profile—stage 8 of FIG. 1

The Benchmark Profile 27 is a fully populated profile (in terms of all combinations of the Benchmark Index having data) that can be directly compared to an individual driver's Analysis Profile.

In this stage, each Analysis Data Point is compared to the corresponding Benchmark Data Point and a result "status" is generated and stored in the Results Profile. The status relates to various thresholds created from the Benchmark Data Point Metric. For example, FIG. 10(*a*) shows an example in which lower, within and higher "bands" are created around the Benchmark Data Point Metric so the status for this comparison could be; below benchmark, within benchmark or above benchmark.

In this example the calculation of the status of a comparison uses just three status types but in other embodiments this scoring method can support multiple threshold points allowing more than three status types.

FIG. 10(b) shows an example that supports multiple threshold points allowing more than three status types. In the example shown in FIG. 10(h), multiple Benchmark Profiles are used to define the Benchmark thresholds thus providing a more sophisticated comparison with the Analysis Profile. In this example, four status types are shown, created by applying three thresholds generated by combining Benchmark Profile Data Points from an Advanced Driver Benchmark Profile (the Ideal) and a Benchmark Profile generated using data from all drivers of all skill levels (Group Profile).

The thresholds t1, t2 and t3 may for example be created using mean and confidence intervals or percentage multipliers of Benchmark Profile Data Points from the various Benchmark Profiles in the following way:

$t1$=Ideal mean−(Ideal stddev*2.33)

$t2$=Ideal mean+(Ideal stddev*1.28)

$t3$=Group mean+(Group stddev*1.28)

In this example, the four status types are; Below Idea, Within Ideal, Within Group and Higher Than Group.

When four status types are utilised, the Status Distribution Results can be made to reflect a higher score for results in the "Within Ideal" status over the "Within Group".

The upper and lower benchmark thresholds as shown in the diagram are calculated from the Benchmark Profile Data Point Metric. One possible method of calculation is to use confidence intervals or percentage multipliers. In this example, the upper and lower benchmark thresholds are calculated using confidence intervals in the following way;

Upper Benchmark threshold=Benchmark Data Point Metric mean value+(0.5×Benchmark Data Point Metric std dev)

Lower Benchmark threshold=Benchmark Data Point Metric mean value+(0.5×Benchmark Data Point Metric std dev)

If there is insufficient, or no data in the Analysis Data Point then no comparison can be made and the result is set to "no data". Alternatively a fall-back scheme can be employed to utilise data from other areas of the Analysis Profile or Driver Profiles to enable a comparison—this is an optional feature of the invention.

The resultant Results Profile contains multiple event type comparisons according to the Results Index (which is identical to the Analysis Index).

Generate driver scores—stage 9 of FIG. 1

A subset of information from the Results Profile is then selected and associated with a series of specific "Driving Performance Tests". These tests are currently defined as:
  "Sp"—Speeds on long straight sections of road not in congestion—giving us a speed preference.
  "Bc"—Braking forces whilst cornering and turning—giving us an indication of how well a driver is planning their speed/braking when approaching corners
  "Bj"—Braking to a low speed for junctions—giving us a measure of aggression and planning
  "Br"—Braking to a high speed whilst on the open straight roads—giving us a measure of how the driver interacts with traffic
  "Aj"—Acceleration from a low speed away from junctions—giving us a measure of aggression
  "Ar"—Acceleration from a high speed on open long straight roads—giving us a measure of aggression and overtaking Each of the above tests represent an important type of driving manoeuvre that when assessed against the context of the surrounding area, gives a good indication of driver preference and personality.

It should be noted that the driver scoring method is not limited to these specific tests. Other tests can be used as well as or in place of the listed tests, and other tests may be added over time and used to improve scoring results.

The following table shows the list of specific Driver Performance tests and the associated relevant event types and Results Index types. These tests are calculated for each of the Road Type and Road Setting (4 types and 3 types respectively in this example, giving 12 sets of results), or at least for all combinations of road type and road setting for which meaningful data are available, to obtain a complete picture of driver behaviour across all road types and settings. Optionally, the entire set of tests can be done separately for familiar roads and unfamiliar roads by selecting data according to the Familiarity Type in the Results Index.

| Driver Performance test name | Event required | Road Length | Road Curvature | Junction Type | Time of Day |
| --- | --- | --- | --- | --- | --- |
| "Sp"—Speed preference | Speed | 1 | 0 | 1 | 1 |
| "Bc"—Braking in corners and turns | Braking when cornering | All types | 1 | 1 | All types |
| "Bj"—braking at junctions | Brake to low speed | All types | 0 | 0 | All types |
| "Br"—braking on open roads | Brake to high speed | 1 | 0 | 1 | All types |
| "Aj"—acceleration from junctions | Acceleration from low speed | All types | 0 | 0 | 1 |
| "Ar"—acceleration on open roads | Acceleration from high speed | 1 | 0 | 1 | All types |

Note:
Road Length, Road curvature, junction type and time of day are "types" within the Results Index, Additional index types can be included in this method of scoring as necessary.

FIG. 11 shows an example of results that e invention may provide. The whole set of Driver Performance Tests as shown in FIG. 11 is known as a "Driver Performance Test Matrix" because it contains all of the relevant information for the driver. In this example results are provided for four different road types (in this example "Trunk", "Major", "Minor" and "Local" and three different road settings (in this example "Urban", "Suburban" and "Rural"), but the invention is not limited to this particular format. The tests results status are shown for each test (so for six tests in this example), against each combination of road type and road setting. The Driver Performance Matrix Diagram may in principle show the absolute results for the driver, but more preferably may show the results for the driver relative to a benchmark. The results may be presented using colour coding (for example Green denotes "below ideal", Blue denotes "within ideal", Red denotes "above ideal". Grey denotes "insufficient data"), so that the driver's performance may be quickly assessed.

Note that in FIG. 11, the driven distance and percentage of total distance the driver has driven in each of the road type and road setting categories is stated. This may be calculated by the invention on an on-going basis and used by the scoring system (as described next).

The Driver Performance Tests results as described above are then further analysed to generate the driver scores.

Turning the Driver Performance Tests Matrix into Driver Scores

The next step involves creating a set of figures relating to how much of the total set of results is in any particular status. The results also need to be weighted according to the total distance travelled within the road type/road setting combination. The resultant calculations will give the following "Status Distribution Results":

% of Sp in "above benchmark" status (red in the example diagram)

% of Sp in "within benchmark" status (blue in the example diagram)

% of Sp in "above benchmark" status (green in the example diagram)

% of Bc in "above benchmark" status

% of Bc in "within benchmark" status

% of Bc in "above benchmark" status

% of Aj in "above benchmark" status

% of Aj in "within benchmark" status

% of Aj in "above benchmark" status

% of Ar in "above benchmark" status

% of Ar in "within benchmark" status

% of Ar in "above benchmark" status

% of Bj in "above benchmark" status

% of Bj in "within benchmark" status

% of Bj in "above benchmark" status

% of Br in "above benchmark" status

% of Br in "within benchmark" status

% of Br in "above benchmark" status

These percentage values represent the percentage of the Driver Performance Tests Matrix in each of the particular status types (either red, blue or green). For example if the entire Driver Performance Matrix is in status "within benchmark" then all of the lines above showing "% of XX in within benchmark status" will be 100% (where "XX" represents each Event type listed).

Generate personality scores from "Status Distribution" values

The invention provides driver scores according to certain characteristics that relate to driving behaviour. For example, in one embodiment the invention can generate the following Driver Scores on the following characteristics:

Aggression—how aggressive a driver is

Anticipation—how much anticipation a driver exhibits when driving

Smoothness—how smooth their driving is (the passenger experience)

Pace—what pace in traffic a driver achieves compared to peers

Expert Driver Score—how close to the ideal a driver is in all respects

A Score Weighting Matrix (as shown below) is used to calculate personality scores factors according to the weighting/mapping from "Status Distribution" percentage scores.

Score Weighing Matrix

| D.M. % value from stage 4 | Driver Scores: | | | | |
|---|---|---|---|---|---|
| | Agression | Anticipation | Pace | Smoothness | Expert Driver |
| Sp (within) | | | 100% | | 10% |
| Sp (higher) | 40% | | | | |
| Sp (lower) | | (10%) | | | |
| Aj (within) | | | | 25% | 15% |
| Aj (higher) | 15% | | | | |
| Aj (lower) | | | | (25%) | |
| Bj (within) | | 20% | | 25% | 15% |
| Bj (higher) | 15% | | | | |
| Bj (lower) | | (20%) | | (25%) | (10%) |
| Ar (within) | | | | 25% | 15% |
| Ar (higher) | 15% | | | | |
| Ar (lower) | | | | (25%) | |
| Br (within) | | 20% | | 25% | 20% |
| Br (higher) | 15% | | | | |
| Br (lower) | | (20%) | | (25%) | (20%) |
| Bc (within) | | 60% | | | 25% |
| Bc (higher) | | | | | |
| Bc (lower) | | (60%) | | | (20%) |
| MAX TOTAL in each Key Driver Metric category | 100% | 100% | 100% | 100% | 100% |

(Note: the "within, "lower" and "higher" refer to the values generated by comparison with the benchmark as shown in FIG. 10(a); further status types may be required in a case where multiple benchmarks are used as shown in FIG. 10(b).)

The figures in brackets show areas where values outside the "ideal" can still contribute to the overall score.

To use this table, values generated are entered into the column on the left and then (for the desired driver score) the percentage weights in the column are used to calculate the overall percentage score.

The advantage of this method is even more apparent when more than three status types are used because it is possible to grade results with a finer level of granularity.

FIG. 12 shows one example of how the scores can be displayed.

The centre dial shows the Expert Driver Score, for example as a percentage. The display also shows the driver's scores for certain characteristics such as, for example, "pace", "anticipation", "aggression" and "smoothness"

FIG. 13 is a schematic block diagram of a programmable apparatus 10 according to the present invention. The apparatus comprises a programmable data process 11 with a programme memory 12, for instance in the form of a read-only memory (ROM), storing a programme for controlling the data processor 11 to perform any of the methods described above, for example generating the behaviour-oriented map, generating a driver profile, or scoring and analysing a driver profile. The apparatus further comprises non-volatile read/write memory 13 for storing, for example, any data which must be retained in the absence of power supply. A "working" or scratch pad memory for the data processor is provided by a random access memory (RAM) 14. An input interface 15 is provided, for instance for receiving commands and data. An output interface 16 is provided, for instance for displaying information relating to the progress and result of the method. Data for processing may be supplied via the input interface 15, or may alternatively be retrieved from a machine-readable data store 17. Thus, when generating the behaviour-oriented map a digital road map would be input via the input interface 15, and the resultant behaviour-oriented map could be output via the output interface 16. When generating a driver profile, position data and optionally other data could be input via the input interface 15 or could be retrieved from the data store 17, and the resultant driver profile could be output via the output interface 16; alternatively, the resultant driver profile may undergo further processing with the driver's scores being output via the output interface 16.

The programme for operating the system and for performing any of the methods described hereinbefore is stored in the programme memory 12, which may be embodied as a semi-conductor memory, for instance of the well-known ROM type. However, the programme may be stored in any other suitable storage medium, such as magnetic data carrier 12*a*, such as a "floppy disk", CD-ROM or DVD-ROM 12*b*.

Glossary

Link
A segment of the navigable road network used by motor vehicles, uniquely identified by a Link ID.

Event
A discrete driver action or manoeuvre. Each event has a type (e.g. speed, acceleration, braking), a map Link ID where the event took place, the time the event occurred and a set of Event Metrics.

Event Metric
One or more measurements that characterise an Event. The metric depends on the type of event and can include e.g. instantaneous speed, maximum acceleration, event duration etc.

Link Indexes
A set of behaviour-oriented attributes associated with a road link, which are usually independent of time and driver.

Dynamic Indexes
A set of indexes that can change with time and/or driver. These can include e.g. date and time of day, whether the driver is familiar with a road link and how congested a road link is.

Profile Index
A combination of Link Indexes for a link and Dynamic Indexes based on the time/date, driver, and location of an event.

Profile Indexed Event
A specific Event with a corresponding Profile Index, determined from the driver and the Link ID and time the event occurred.

Profile Data Point
An aggregation of one or more Profile Indexed Events, grouped by Profile Index. Each Profile Data Point has a type, a Profile Index and Profile Data Point Metrics. Profile Data Point Metrics An aggregation of the Event Metrics from all the Events that make up a Profile Data Point. Profile Data Point Metrics are often statistical measures of the distribution of the Event Metrics, such as mean and variance, but could be other measures such as peak values or percentiles.

Driver Profile
A set of Profile Data Points that contains all the Profile Data Points generated by a driver.

Analysis Index
A subset of Profile Indexes selected to identify specific driving behaviours. Multiple Profile Indexes may be grouped together to create a single Analysis index.

Analysis Data Point
An aggregation of one or more Profile Data Points, grouped by Analysis Index. Each Analysis Data Point has a type, an Analysis Index and Analysis Data Point Metrics.

Analysis Data Points and their Metrics are aggregated measures of the most valuable Event metrics for the purposes of scoring driver behaviour.

Analysis Data Point Metrics
An aggregation of the Profile Data Point Metrics from all the Profile Data Points that make up an Analysis Data Point.

Analysis Profile
A set of Analysis Data Points that contain all the Analysis Data Points generated by a driver.

Benchmark Data Point
An Analysis Data Point for a reference driver. Used when generating the Threshold Comparison Status during the scoring process. Benchmarks can be based on absolute values or can be programmatically generated from the Events of a set of real reference drivers.

Benchmark Data Point Metrics
The Analysis Data Point Metrics for a Benchmark Data Point.

Benchmark Thresholds
A set of bounding values for the Benchmark Data Point Metrics of a Benchmark Data Point. These are typically upper and lower threshold values, but can also include multiple levels above and/or below the values in the Benchmark Data Point Metrics.

Benchmark Profile
A set of Benchmarks Data Points and their associated Metrics and Thresholds that represent a synthetic driver for the purposes of comparative scoring.

Threshold Comparison Status
The result of comparing a driver's Analysis Data Point with the corresponding Benchmark Threshold. It is generated when computing a driver score. Values are Benchmark dependent and typical Threshold Comparison Statuses can include "higher", "within" and "lower".

Results Profile Index
An Analysis Index used for indexing Threshold Comparison Statuses in a Results Profile Results Profile Data Point
The result of comparing an Analysis Data Point with a Benchmark Data Point using its Benchmark Thresholds. Contains a Results Profile Index, Event Type and Threshold Comparison Status.

Results Profile
A set of all the Results Profile Data Points for a driver.

Driver Performance Tests
A set of specific driving manoeuvres and associated conditions that represent key areas used in the scoring process.

Driver Performance Tests Matrix
The entire set of Driver Performance Tests across all road types and road settings. Status Distribution Results The values calculated from the Driver Performance Tests Matrix providing an analysis of the percentage of the number of tests across the entire matrix in any particular status and weighted by the distance travelled in any particular road type and road setting "cell" in the matrix Driver Scores
A numeric score that provides a measure of a personality trait or other conclusion generated by the invention.

Score Weighting Matrix
This maps the relationship between the Status Distribution Results and desired Driver Scores Road Type: An attribute of a road link that describes its importance for traffic; one of Trunk, Major, Minor or Local Road Setting:
An attribute of a road link that describes how metropolitan its surrounding area is; one of Urban. Suburban or Rural Road Classification:
A unique combination of Road Type and Road Setting, e.g. Rural Trunk or Urban Minor

What is claimed is:

1. A computer-implemented method of profiling a driver comprising:
   obtaining, by a position sensor mounted on a vehicle, data representing motion of the vehicle;
   generating a network of links from a road map;
   generating, for a link of the network of links, one or more link indexes, at least one link index being associated with a feature of the link that influences a behaviour of the driver of the vehicle travelling along the link;
   identifying, by a processor, events in the data representing motion of the vehicle, the events including acceleration events and braking events characterised by a speed at which the vehicle was travelling when respective event occurred;
   selecting, by the processor, one or more of the events based on a profile index associated with the respective event and on at least one attribute derived from the respective event, the profile index relating to the link on which the vehicle was travelling at a point during the respective event, wherein the profile index relating to the link is derived at least from the one or more of the link indexes relating to one or more features of the link that influence a behaviour of the driver of the vehicle travelling along the link;
   determining, by the processor, a driver profile from the one or more selected events;
   characterising, by the processor, the driving behaviour of the driver on a basis of the driver profile; and
   providing an output interface comprising a display of an overall driver score presented in conjunction with one or more sub-scores that provide a measure of the characterised driving behaviour of the driver.

2. The method as claimed in claim 1 wherein the at least one attribute derived from the respective event includes at least one of: a start time of the event; a finish time of the event; a duration of the event; a start location of the event; a finish location of the event; an intermediate location of the event; a start speed; a finish speed; or a maximum rate of acceleration or braking.

3. The method as claimed in claim 1 wherein the profile index relating to the link is further derived from one or more indexes that are time-dependent or driver dependent.

4. The method as claimed in claim 1 wherein the one or more events further comprise one or more events selected from the group consisting of: speed events, cornering events, familiarity events recording that the vehicle has driven on a specific road link and distance events.

5. The method as claimed in claim 1 wherein the one or more link indexes include at least one index specifying a road classification of the link on which the event occurred, and wherein the road classification includes at least one of: a road category and a road setting.

6. The method as claimed in claim 1 wherein the determining the driver profile further comprises grouping events by both event category and profile index.

7. The method as claimed in claim 1 further comprising deriving an analysis profile from the driver profile, the analysis profile containing less details than the driver profile.

8. The method as claimed in claim 7 wherein data points in the driver profile are, for at least one profile index, classified against a plurality of possible values for the profile index, and wherein deriving the analysis profile comprises selecting data points corresponding to a subset of possible values of the profile index.

9. The method as claimed in claim 7 wherein data points in the driver profile are, for at least one profile index, classified against a plurality of possible values for the profile index, and wherein deriving the analysis profile comprises merging two or more possible values of the profile index.

10. The method as claimed in claim 7 further comprising comparing the analysis profile to a reference profile.

11. The method as claimed in claim 10 wherein the reference profile is a profile for one or more advanced drivers or wherein the reference profile is a profile for one or more drivers of approximately same age or driving experience as the driver.

12. The method as claimed in claim 10 wherein the reference profile is a profile obtained by combining at least a first profile for a first group of drivers and a second profile for a second group of drivers.

13. The method as claimed in claim 1 wherein the position sensor is independent of a main bus of the vehicle.

14. The method as claimed in claim 1 wherein the position sensor is a GPS sensor.

15. The method as claimed in claim 1 wherein the position sensor records at least a position of the vehicle at successive sampling times.

16. The method as claimed in claim 1 wherein the data representing motion of the vehicle is transmitted to a processing location.

17. The method as claimed in claim 16 wherein the data is transmitted to the processing location in real time or in near real time.

18. The method as claimed in claim 1 wherein the data representing motion of the vehicle is filtered, the filtering applied being selected based on the position sensor.

19. A non-transitory computer-readable medium containing instructions that, when executed by a processor, cause the processor to perform operations comprising:
   generating a network of links from a road map;
   generating, for a link of the network of links, one or more link indexes, at least one link index being associated with a feature of the link that influences a behaviour of a driver of a vehicle travelling along the link;
   identifying events in data obtained by a position sensor mounted on the vehicle, representing motion of the vehicle, the events including acceleration events or braking events characterised by a speed at which the vehicle was travelling when respective event occurred;
   selecting one or more of the events based on a profile index associated with the respective event and on at least one attribute derived from the respective event, the profile index relating to the link on which the vehicle was travelling at a point during the respective event, wherein the profile index relating to the link is derived at least from one or more of the link indexes relating to one or more features of the link that influence the behaviour of the driver of the vehicle travelling along the link;
   determining a driver profile from the one or more selected events;
   characterising the driving behaviour of the driver on a basis of the driver profile; and
   providing an output interface comprising a display of an overall driver score presented in conjunction with one or more sub-scores that provide a measure of the characterised driving behaviour of the driver.

* * * * *